US011055757B2

(12) United States Patent
Schulz et al.

(10) Patent No.: US 11,055,757 B2
(45) Date of Patent: Jul. 6, 2021

(54) MULTI-PLATFORM E-COMMERCE SYSTEM WITH ASYNCHRONOUS CART

(71) Applicant: Violet.io, Inc., Seattle, WA (US)

(72) Inventors: Brandon Schulz, Seattle, WA (US); Rhen Zabel, Seattle, WA (US)

(73) Assignee: Violet.io, Inc., Seattle, WA (US)

( * ) Notice: Subject to any disclaimer, the term of this patent is extended or adjusted under 35 U.S.C. 154(b) by 315 days.

(21) Appl. No.: 15/953,068

(22) Filed: Apr. 13, 2018

(65) Prior Publication Data

US 2019/0318403 A1    Oct. 17, 2019

(51) Int. Cl.
*G06Q 30/00* (2012.01)
*G06Q 30/06* (2012.01)

(52) U.S. Cl.
CPC ..... *G06Q 30/0619* (2013.01); *G06Q 30/0633* (2013.01)

(58) Field of Classification Search
None
See application file for complete search history.

(56) References Cited

U.S. PATENT DOCUMENTS

| | | |
|---|---|---|
| 6,499,036 B1 | 12/2002 | Gurevich |
| 6,658,483 B1 | 12/2003 | Iwamoto et al. |
| 6,778,651 B1 | 8/2004 | Jost et al. |
| 6,871,187 B1 | 3/2005 | Gosko |
| 7,660,874 B1 | 2/2010 | Meltzer et al. |
| 7,996,295 B1 | 8/2011 | Gosko |
| 8,612,295 B2 | 12/2013 | Gidwani et al. |
| 9,721,251 B1 * | 8/2017 | Jen .......... G06Q 20/40 |
| 9,799,026 B1 | 10/2017 | Allen et al. |
| 10,055,779 B1 * | 8/2018 | Varma ............ G06Q 20/401 |
| 10,062,103 B2 | 8/2018 | Wantz, II et al. |
| 10,121,176 B2 * | 11/2018 | Buezas ............ G06Q 30/0613 |
| 10,395,293 B1 | 8/2019 | Mangtani et al. |
| 10,529,008 B1 | 1/2020 | Pritchard et al. |

(Continued)

FOREIGN PATENT DOCUMENTS

| | | | |
|---|---|---|---|
| WO | WO-0197149 A2 * | 12/2001 | ......... G06Q 30/0609 |
| WO | 2002/0765597 A2 | 9/2002 | |

OTHER PUBLICATIONS

Zheng Qin, "Introduction to E-commerce", 2009, Springer, springer.com (Year: 2009).*

(Continued)

*Primary Examiner* — Naeem U Haq
*Assistant Examiner* — Norman Donald Sutch, Jr.
(74) *Attorney, Agent, or Firm* — Seed IP Law Group LLP

(57) ABSTRACT

A multi-platform e-commerce system with an asynchronous virtual cart is disclosed. The system includes one or more processors and a memory device storing a set of instructions that when executed by the one or more processors, causes the one or more processors to: create an internal virtual cart associated with the multi-platform e-commerce system; in response to the creation of the internal virtual cart, create an external asynchronous virtual cart associated with one or more single e-commerce platforms; in response to every action taken in the internal virtual cart associated with the multi-platform e-commerce system, enable performance of an immediate corresponding action on the external asynchronous virtual cart associated with the one or more single e-commerce platforms.

17 Claims, 9 Drawing Sheets

(56) References Cited

U.S. PATENT DOCUMENTS

| | | |
|---|---|---|
| 2002/0103658 A1 | 8/2002 | Angal et al. |
| 2002/0116205 A1 | 8/2002 | Ankireddipally et al. |
| 2003/0040976 A1 | 2/2003 | Adler et al. |
| 2003/0083961 A1 | 5/2003 | Bezos et al. |
| 2005/0102188 A1 | 5/2005 | Hutchison et al. |
| 2005/0149419 A1* | 7/2005 | Blumberg .............. G06Q 40/00 705/35 |
| 2006/0011720 A1 | 1/2006 | Call |
| 2006/0271446 A1 | 11/2006 | Leon et al. |
| 2007/0112579 A1* | 5/2007 | Ratnakaran ........... G06Q 30/06 705/1.1 |
| 2007/0260531 A1 | 11/2007 | Bezancon |
| 2010/0100814 A1 | 4/2010 | Meltzer et al. |
| 2011/0320299 A1 | 12/2011 | Gidwani et al. |
| 2012/0078731 A1 | 3/2012 | Linevsky et al. |
| 2012/0290203 A1 | 11/2012 | King |
| 2012/0310780 A1 | 12/2012 | Tenorio |
| 2012/0330769 A1* | 12/2012 | Arceo ................ G06Q 20/4014 705/21 |
| 2013/0054484 A1 | 2/2013 | Hoeflinger et al. |
| 2013/0080319 A1 | 3/2013 | Greenstone |
| 2013/0151352 A1* | 6/2013 | Tsai .................. H04N 21/4438 705/14.73 |
| 2013/0290203 A1* | 10/2013 | Purves .................. G06Q 50/01 705/319 |
| 2013/0332838 A1 | 12/2013 | Naggar et al. |
| 2014/0019298 A1* | 1/2014 | Suchet ............... G06Q 30/0633 705/26.8 |
| 2014/0279214 A1 | 9/2014 | Wagoner-Edwards et al. |
| 2015/0154687 A1 | 6/2015 | Bellora et al. |
| 2015/0154689 A1 | 6/2015 | Fitzpatrick |
| 2015/0278931 A1 | 10/2015 | Wantz et al. |
| 2015/0287111 A1 | 10/2015 | Ogrinz et al. |
| 2015/0302424 A1* | 10/2015 | Akbarpour ......... G06Q 30/0222 705/7.29 |
| 2015/0339661 A1 | 11/2015 | Li et al. |
| 2016/0012499 A1 | 1/2016 | Linevsky et al. |
| 2016/0019628 A1* | 1/2016 | Udumudi ........... G06Q 30/0633 705/26.8 |
| 2016/0027013 A1 | 1/2016 | Modi |
| 2016/0127466 A1 | 5/2016 | Albrecht et al. |
| 2016/0140519 A1 | 5/2016 | Trepca et al. |
| 2016/0239861 A1 | 8/2016 | Hage |
| 2017/0011450 A1 | 1/2017 | Frager et al. |
| 2017/0193507 A1 | 7/2017 | Jones |
| 2017/0262930 A1 | 9/2017 | Acharya et al. |
| 2017/0287055 A1 | 10/2017 | Fitzpatrick |
| 2017/0308926 A1 | 10/2017 | Wofford et al. |
| 2017/0345105 A1 | 11/2017 | Isaacson et al. |
| 2019/0188634 A1 | 6/2019 | Yamaguchi et al. |
| 2019/0272579 A1 | 9/2019 | Edwards et al. |
| 2019/0287307 A1* | 9/2019 | Rogers ................. G06Q 20/145 |

OTHER PUBLICATIONS

PR Newswire; "New Google Chrome Extension Provides Universal Shopping Cart, Makes Entire Internet Shoppable"; Nov. 17, 2015; PR Newswire Association LLC (Year: 2015).*

Eugeniya, "How to Create a Two-Sided Online Marketplace Platform?," Jan. 6, 2017, URL=https://hackernoon.com/how-to-create-a-two-sided-online-marketplace-platform-6d1Oeb9c03db, download date Jul. 29, 2019, 16 pages.

Salem et al., "Active XML-based Web data integration," *Inf Syst Front* 15:371-398, 2013.

* cited by examiner

Shopify
```
{
    "...":"...",
    "variants": [{
        "...":"...",
        "id": 12345,          A
        "title": "Black/Small",
        "price": "19.99",     B
        "option1": "Black",   C
        "option2": "Small",   D
        "inventory_quantity": 100   E
    }],
    "options":[{
        "...":"...",
        "id": 456,            F
        "name": "Color",      G
        "values": {
            "Black"           C
        ]
    },
    {
        "...":"...",
        "id": 789,            H
        "name": "Size",       I
        "values":[
            "Small"           D
        ]
    }
    }
}
```

Woocommerce
```
{
    "...":"...",
    "attributes": [{
        "...":"...",
        "id": 0,
        "name": "Size",       I
        "options": ["Small"]  D
    },{
        "...":"...",
        "id": 0,
        "name": "Color",      G
        "options": ["Black"]  C
    }],
    "variations": [{
        "...":"...",
        "id": 12345,          A
        "regular_price": "19.99",
        "sale_price": "19.99",    B
        "Stock_quantity": 100     E
        "in_stock": true,
        "attributes":[{
            "id": 789,        H
            "name": "size",
            "option": "Small" D
        },{
            "id": 456,        F
            "name": "color",
            "option": "Black" C
        }]
    }]
}
```

FIG. 3A

```
VIOLET
{
  "...","..",
  "variants": [{
    "...","..",
    "name": "Size",
    "values": [{
      "...","..",
      "name": "Small",  D
      "display_order": 1
    }]
  },
  {
    "...","..",
    "name": "Color",  G
    "values": [{
      "...","..",
      "name": "Black",  C
      "display_order": 1,
      "hex": "#000000"
    }]
  }
  ],
  "offers": [{
    "...","..",
    "variants": [{
      "...","..",
      "external_id": "789",  H
      "name": "Size",
      "values": [{
        "external_id": "Small",  D
        "name": "Small"  D
      }]
    },
    {
      "...","..",
      "external_id": "456",  F
      "name": "Color",  G
      "values": [{
        "external_id": "Black",  C
        "name:": "Black"  C
      }]
    }
    ],
    "skus": [{
      "...","..",
      "external_id": "12345",  A
      "name": "Black C/Small",  D
      "qty_available": 100,  E
      "in_stock": true,
      "sale_price": 1999  B
    }]
  }]
}
```

FIG. 3B

```
┌─────────────────────────┐        ┌─────────────────────────┐
│      Bigcommerce        │        │       Magento 1         │
├─────────────────────────┤        ├─────────────────────────┤
│ {                       │        │ {                       │
│   "...":"...",          │        │   "...":"...",          │
│   "variants": [{        │        │   "options": [{         │
│      "...":"...",       │        │      "...":"...",       │
│      "price": 19.99 B   │        │      "id": "456" F      │
│      "inventory_level": │        │      "label": "Color" G │
│          100 E          │        │      "values": [{       │
│      "sku_id": 12345 A  │        │         "...":"...",    │
│      "option_values":[{ │        │         "value_index":"1",│
│         "...":"...",    │        │         "label": "Black"C│
│         "label": "Black"C/"Small"D│     }]                 │
│         "id": 0         │        │   },                    │
│      }]                 │        │   {                     │
│   }]                    │        │      "...":"...",       │
│ }                       │        │      "id": "789" H      │
│                         │        │      "label": "Size",   │
│                         │        │      "values": [{       │
│                         │        │         "...":"...",    │
│                         │        │         "value_index":"1",│
│                         │        │         "label": "Small"D│
│                         │        │      }]                 │
│                         │        │   }                     │
│                         │        │   ],                    │
│                         │        │   "children": [{        │
│                         │        │      "...":"...",       │
│                         │        │      "entity_id":"12345"A│
│                         │        │      "price": "19.9900"B│
│                         │        │      "variants": [{     │
│                         │        │         "option_id":"10",│
│                         │        │         "value_id": "1" │
│                         │        │      },                 │
│                         │        │      {                  │
│                         │        │         "option_id":"11",│
│                         │        │         "value_id": "1" │
│                         │        │      }                  │
│                         │        │      ],                 │
│                         │        │      "qty":"100.0000" E │
│                         │        │   }]                    │
│                         │        │ }                       │
└─────────────────────────┘        └─────────────────────────┘
```

FIG. 3C

MULTI-PLATFORM E-COMMERCE SYSTEM WITH ASYNCHRONOUS CART

TECHNICAL FIELD

The present disclosure generally relates to e-commerce systems and methods, and particularly, to headless multi-platform e-commerce systems and methods.

BACKGROUND

Description of the Related Art

The world of commerce has been revolutionized over the past few decades with the growth of the Internet and the development of electronic commerce ("e-commerce"). In this regard, it is now possible to purchase a product on-line through a website, using, for example, a desktop computer, or through mobile applications ("apps"), using a smart phone or other portable computing device (e.g., phablet, tablet, portable digital assistant, and the like). A website or mobile app may be the presentation layer of the e-commerce "front end." Typically, this e-commerce "front end" incorporates manual user input (e.g., typing interface, touchscreen, mouse, and the like). Additionally, there are a few e-commerce "front ends" that enable voice interaction for e-commerce purchases (e.g., Amazon or Google Home). These various apps (e.g., website, mobile, voice and the like) utilize underlying sets of technological architectures that provide configurations and unique functionality to enable a transaction. These technological architectures, which are generally referred to as e-commerce platforms, are each highly limited and narrowly focused implementations for very specific criteria.

E-commerce platforms were a significant advancement in the world of commerce because they allowed people to exchange goods and services using the Internet. However, the rapid growth and limited front end capabilities of these e-commerce platforms have resulted in highly siloed and ocified e-commerce systems that only function for within specific parameters. Generally speaking, these e-commerce platforms store product information, and surface almost exclusively in the form of a website or mobile application to facilitate a transaction.

As defined herein, a merchant is a company that sells a product on-line in some manner (i.e., an on-line store owner). Almost all on-line commerce is conducted through the e-commerce platforms described above. Typically, a merchant sells several different products. The merchant uploads the necessary product information into the e-commerce platform, and the product information is published to the merchant's website. For example, a company like NIKE (for the sake of example) would be considered a merchant. The XYZ company might use an e-commerce platform, such as Magento, to manage their products. In this manner, XYZ uploads the necessary product information to Magento, and the product information is published to the XYZ's website. A consumer can then go to www.xyz.com to browse products and make purchases. This is representative of the way that ecommerce works today and has worked for 20 years.

Credit card processing for these types of e-commerce platform transactions is usually performed by a third party, not the e-commerce platform. Such credit card processing companies include Stripe, Authorize.net, PayPal, and others. These transaction systems contain no product data and have no integration into ecommerce platforms.

However, the e-commerce platforms that are used today have many technological problems and/or limitations from the viewpoint of on-line merchants. These merchants have many products that they want to sell. However, the merchants wind up spending an undesirably large amount of time and money managing their e-commerce platforms, optimizing their website, and advertising on the Internet. These activities are generally referred to as digital merchandising. Unfortunately, all of the products the merchant is managing at their selected e-commerce platform are distributed to one "store." Accordingly, for the XYZ company, their products are only distributed to www.xyz.com.

An on-line merchant may market and advertise their products in different locations throughout the Internet, but all of the users are directed back to the on-line merchant's website in order to make the purchase. This "single location issue" is a significant technological problem in digital retail. Due to this single location limitation, an on-line merchant is only able to have its store in one digital location.

In physical retail, merchants acknowledge that business success may be greatly affected by the number of locations of retail stores and the geographical locations of the retail stores. In the physical world, "brick and mortar" merchants solve the issue of distribution by opening more stores, by opening stores in more prime locations, or by finding other stores that will carry their products. However, in the digital world, merchants have not yet determined how to have more stores throughout the Internet due to the technological obstacles that stand in the way of such development. Several app developers have attempted, albeit unsuccessfully, to bring more commerce ability to their experiences. While some apps have been able to create interactive images from multiple on-line retail locations or merchants, these have not been fully functional stores embedded in different environments on the World Wide Web.

Typically, many applications in today's world are monetized either by subscription revenues or through advertising. In this regard, application developers and companies are always looking for new and unique ways to monetize. Currently, some application developers and companies have been more successful in monetizing, while other applications have been less successful. Today's applications generate a majority of their advertising revenue by marketing a product in a rich and engaging way, even though their e-commerce transaction methodology is typically cumbersome (e.g., watch a video, swipe up, view a page, add the product to a virtual shopping cart ("cart"), sign in or create an account, fill out shipping details, billing details, and complete the purchase). Traditionally, the advertising revenue is captured through views or clicks. It is not tied to actual conversions or purchases. Further, within those applications there is a high rate of drop off once a click out happens, and an even higher rate of abandonment when someone has to sign in, or checkout as a guest, on that unfamiliar website.

There is a continuing need in the art for an underlying retail technology that provides a seamless buying experience native to any type of application on the Internet and their various manifestations.

BRIEF SUMMARY

In some implementations of the multi-platform e-commerce distribution system, on-line merchants are provided with a "plug-in" (i.e., a software component that adds a specific feature to an existing computer program) that opens up an entire distribution network for the on-line merchants' products that they are then able to leverage. In this manner, on-line merchants can create more instances of their own stores throughout the Internet on different properties. Additionally, various applications can now 'sell product on-line' without having to go through the technological impediment of actual inventory purchases and physical transfer of products from warehouse to warehouse before a transaction takes place. Accordingly, by using an implementation of the multi-platform e-commerce distribution system, one merchant with a single store may now have thousands of different opportunities for consumers to buy their product, no matter where the consumers might be on the Internet or even in physical retail locations purchasing digitally. In various implementations, a product may be defined as any type of saleable products or services that may be physical, virtual, downloadable, intangible, licensable (e.g., software or software as a service), experiential, as well as other products or services, and the like. These on-line retail stores may be created by app developers. As defined herein, an app developer is any company, individual, or group of individuals that creates an application that exists on the internet. This application can be a web, mobile, AR, VR, voice, social, robotic, gaming, or other type of app on any and all platforms.

A processor-enabled multi-platform e-commerce system with an asynchronous virtual cart may be summarized as including one or more processors and a memory device storing a set of instructions that when executed by the one or more processors, causes the one or more processors to take the following actions: create an internal virtual cart associated with the multi-platform e-commerce system; in response to the creation of the internal virtual cart, create an external asynchronous virtual cart associated with one or more single e-commerce platforms; upon receiving an incoming product order request from one or more third-party applications, add the product order request to the internal virtual cart; in response to adding the product order request to the internal virtual cart, send instructions to add the product order request to the external asynchronous virtual cart associated with the one or more single e-commerce platforms; upon receiving an order completion instruction from the one or more third-party applications, send payment authorization to a payment gateway; upon receiving payment authorization results from the payment gateway, submit a product order to the one or more single e-commerce platforms; send payment capture instructions to the payment gateway; and receive payment capture results from the payment gateway.

In some implementations, the memory device further stores a set of instructions that when executed by the one or more processors, causes the one or more processors to: upon receiving a second incoming product order request from a second third-party application, add the second product order request to the internal virtual cart; and in response to adding the second product order request to the internal virtual cart, send instructions to add the second product order request to the external asynchronous virtual cart. In another aspect of some implementations, the memory device further stores a set of instructions that when executed by the one or more processors, causes the one or more processors to: upon receiving an another incoming product order request from another third-party application, add the another product order request to the internal virtual cart; and in response to adding the another product order request to the internal virtual cart, send instructions to add the another product order request to the external asynchronous virtual cart.

In some implementations, the memory device further stores a set of instructions that when executed by the one or more processors, causes the one or more processors to: upon receiving set shipping address instructions from another third-party application, send the set shipping address instructions to the internal virtual cart; and in response to sending the set shipping address instructions to the internal virtual cart, send instructions to set a shipping address to the external asynchronous virtual cart. In another aspect of some implementations, the memory device further stores a set of instructions that when executed by the one or more processors, causes the one or more processors to: upon receiving set billing address instructions from another third-party application, send the set billing address instructions to the internal virtual cart; and in response to sending the set billing address instructions to the internal virtual cart, send instructions to set a billing address to the external asynchronous virtual cart. In still another aspect of some implementations, the memory device further stores a set of instructions that when executed by the one or more processors, causes the one or more processors to: upon receiving set shipping method instructions from another third-party application, send the set shipping method instructions to the internal virtual cart; and in response to sending the set shipping method instructions to the internal virtual cart, send instructions to set a shipping method to the external asynchronous virtual cart.

In some implementations of the processor-enabled multi-platform e-commerce system with an asynchronous virtual cart, the memory device further stores a set of instructions that when executed by the one or more processors, causes the one or more processors to: upon receiving price cart contents instructions from another third-party application, send the price cart contents instructions to the internal virtual cart; and in response to sending the price cart contents instructions to the internal virtual cart, send instructions to price cart contents to the external asynchronous virtual cart. In another aspect of some implementations, a payment captured from the payment gateway includes a merchant's portion of the captured payment, and the merchant's portion of the captured payment is sent directly to the merchant without being escrowed by the multi-platform e-commerce system or any other third-party account.

In still another aspect of some implementations, the system further includes a return management system that tracks product returns, and a product return automatically triggers reversal of the payment transaction including return of the merchant's portion of the captured payment, which is sent directly from the merchant to the payment gateway without being escrowed by the multi-platform e-commerce system or any other third-party account. In still another aspect of some implementations, every action taken in the internal virtual cart associated with the multi-platform e-commerce system, results in an immediate corresponding action being performed on the external asynchronous virtual cart associated with the one or more single e-commerce platforms.

In another implementation, the processor-enabled multi-platform e-commerce system with an asynchronous virtual cart may be summarized as including one or more processors and a memory device storing a set of instructions that when executed by the one or more processors, causes the one or more processors to take the following actions: create an internal virtual cart associated with the multi-platform e-commerce system; in response to the creation of the internal virtual cart, create an external asynchronous virtual cart associated with one or more single e-commerce platforms; upon receiving an incoming product order request from one or more third-party applications, add the product order request to the internal virtual cart; in response to adding the product order request to the internal virtual cart, send instructions to add the product order request to the external asynchronous virtual cart associated with the one or more single e-commerce platforms; upon receiving an incoming additional product order request from another third-party application, add the additional product order request to the internal virtual cart; in response to adding the additional product order request to the internal virtual cart, send instructions to add the additional product order request to the external asynchronous virtual cart; upon receiving an order completion instruction from one or more third-party applications, send payment authorization to a payment gateway; upon receiving payment authorization results from the payment gateway, submit a product order to the one or more single e-commerce platforms; send payment capture instructions to the payment gateway; and receive the payment capture results from the payment gateway.

In still another implementation, the processor-enabled multi-platform e-commerce system with an asynchronous virtual cart may be summarized as including one or more processors and a memory device storing a set of instructions that when executed by the one or more processors, causes the one or more processors to take the following actions: create an internal virtual cart associated with the multi-platform e-commerce system; in response to the creation of the internal virtual cart, create an external asynchronous virtual cart associated with one or more single e-commerce platforms; and in response to every action taken in the internal virtual cart associated with the multi-platform e-commerce system, enable performance of an immediate corresponding action on the external asynchronous virtual cart associated with the one or more single e-commerce platforms.

In some implementations of the processor-enabled multi-platform e-commerce system with an asynchronous virtual cart, the memory device further stores a set of instructions that when executed by the one or more processors, causes the one or more processors to: upon receiving an order completion instruction from one or more third-party applications, send payment authorization to a payment gateway; upon receiving payment authorization results from the payment gateway, submit product order to the one or more single e-commerce platforms; send payment capture instructions to a payment gateway; and receive payment capture results from the payment gateway.

In another aspect of some implementations, the system creates a single point of entry for merchant companies for distribution to the third-party applications on the Internet. In still another aspect of some implementations, the system creates access to a single distribution house in the digital world for third-party application developers and end purchasers. In yet another aspect of some implementations, the system enables merchants to individually modify rates of revenue being offered to third-party application developers that helped generate the transaction between the third-party application developers. In another implementation, the system enables merchants to set default rates of revenue being offered to third-party application developers that helped generate the transaction between the third-party application developers, and enables merchants to set custom rates of revenue being offered to third-party application developers that helped generate the transaction between the third-party application developers for specific products.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIGS. 3A, 3B, and 3C are schematic diagrams of sample product schema for the multi-platform e-commerce distribution system in which the different superscripts correspond to values that are being cross-translated by the system.

DETAILED DESCRIPTION

Figure 1:
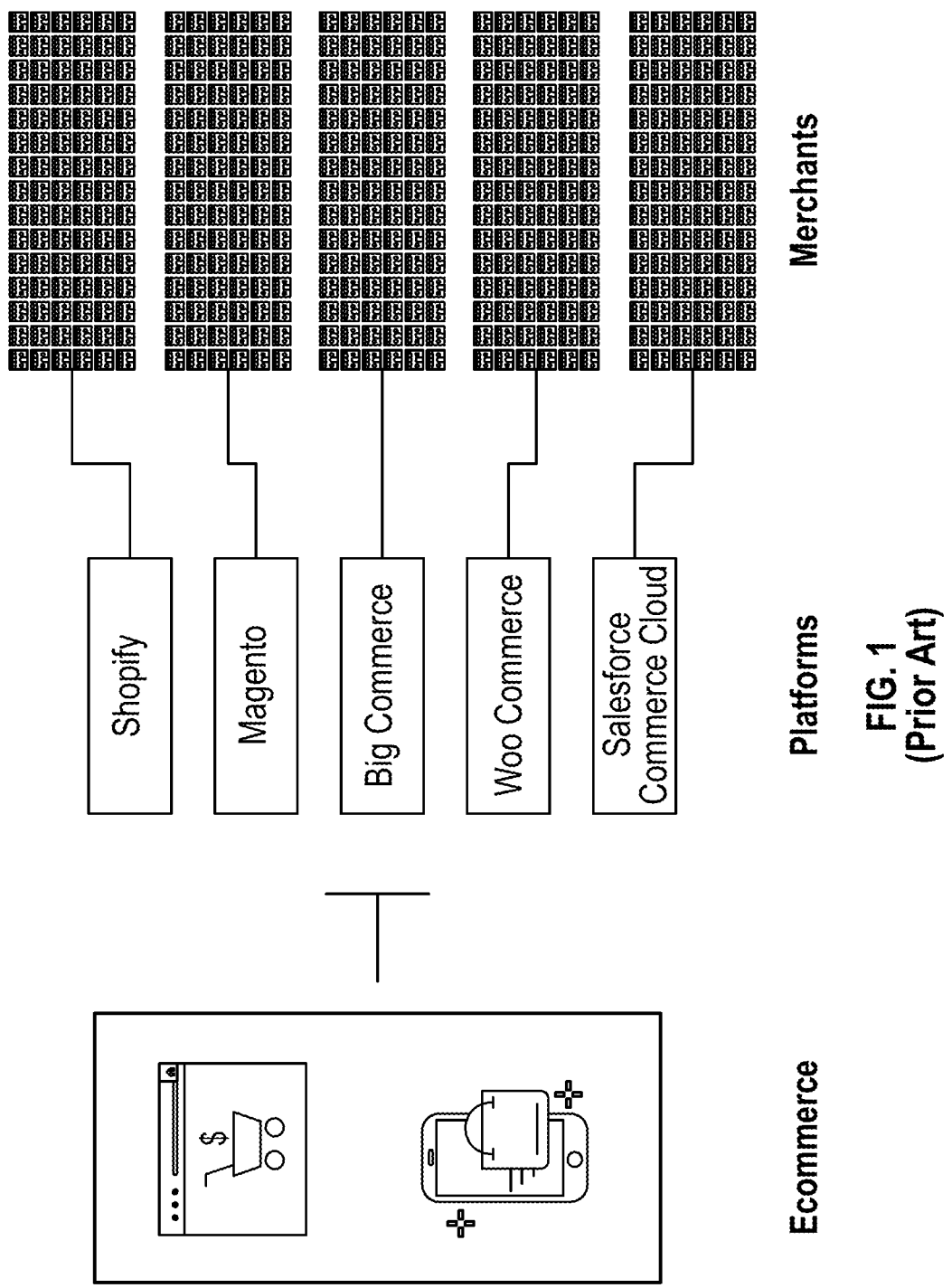
FIG. 1 is a schematic diagram that shows on-line merchants connecting to e-commerce functionality through legacy prior art e-commerce platforms in the way that these systems generally work today.

Persons of ordinary skill in the art will understand that the present disclosure is illustrative only and not in any way limiting. Each of the features and teachings disclosed herein can be utilized separately or in conjunction with other features and teachings to provide a system and method for a Headless multi-platform e-commerce distribution system. Representative examples utilizing many of these additional features and teachings, both separately and in combination, are described in further detail with reference to the attached figures. This detailed description is merely intended to teach a person of skill in the art further details for practicing aspects of the present teachings, and is not intended to limit the scope of the claims. Therefore, combinations of features disclosed in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities, and are merely convenient labels applied to these quantities. Unless specifically stated otherwise as apparent from the below discussion, it is appreciated that throughout the description, discussions utilizing terms such as "processing," "computing," "calculating," "determining," "displaying," "configuring," or the like, refer to the actions and processes of a computer system, or similar electronic computing device, that manipulate and transform data represented as physical (electronic) quantities within the computer system's registers and memories into other data similarly represented as physical quantities within the computer system memories or registers or other such information storage, transmission or display devices.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Unless the context requires otherwise, throughout the specification and claims which follow, the word "comprise" and variations thereof, such as "comprises" and "comprising," are to be construed in an open, inclusive sense, that is, as "including, but not limited to." Reference throughout this specification to "one implementation" or "an implementation" means that a particular feature, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise. The headings and Abstract of the Disclosure provided herein are for convenience only and do not interpret the scope or meaning of the implementations.

FIG. 1 shows on-line merchants connecting to e-commerce functionality through legacy e-commerce platforms. As such, FIG. 1 shows the prior art e-commerce transaction configuration.

Figure 2A:
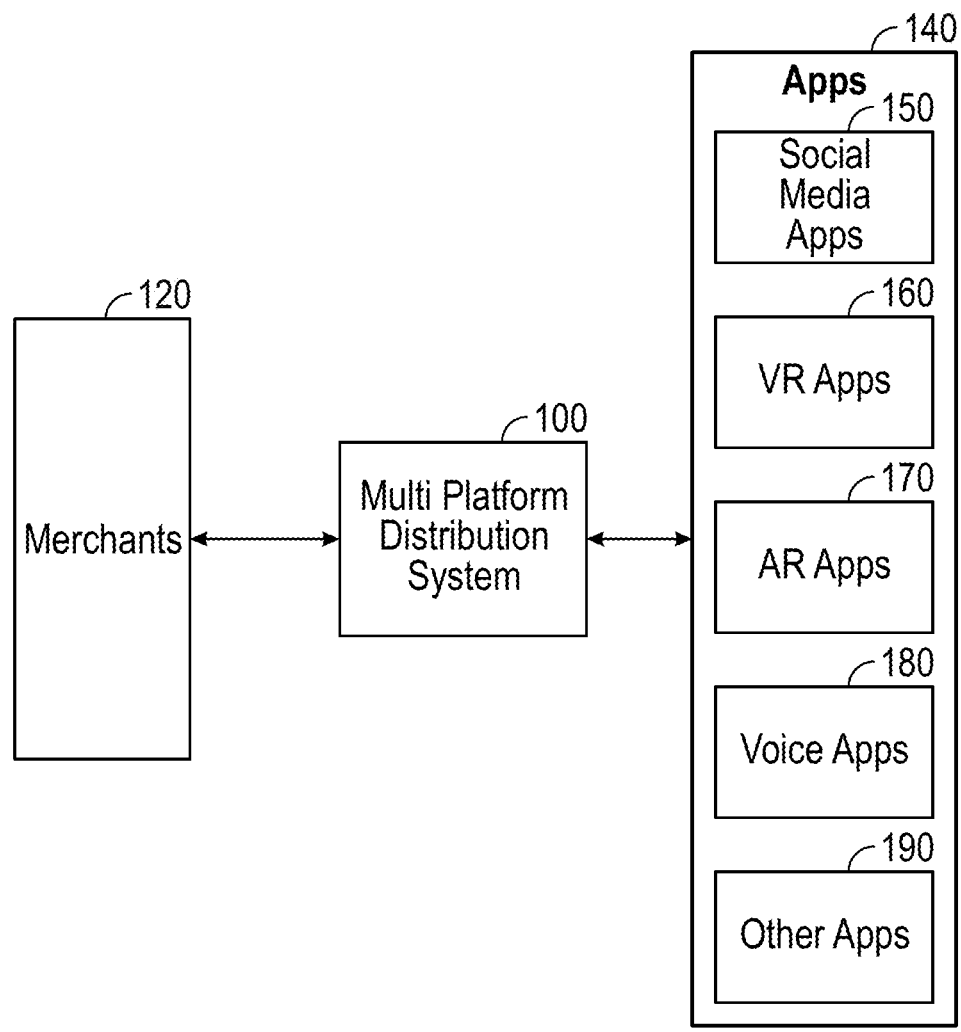
FIG. 2A is a schematic diagram of an implementation of the multi-platform e-commerce distribution system that is positioned between on-line merchants on one side and consumers (e.g., website, mobile, and various other applications) on the other side.
Figure 2B:
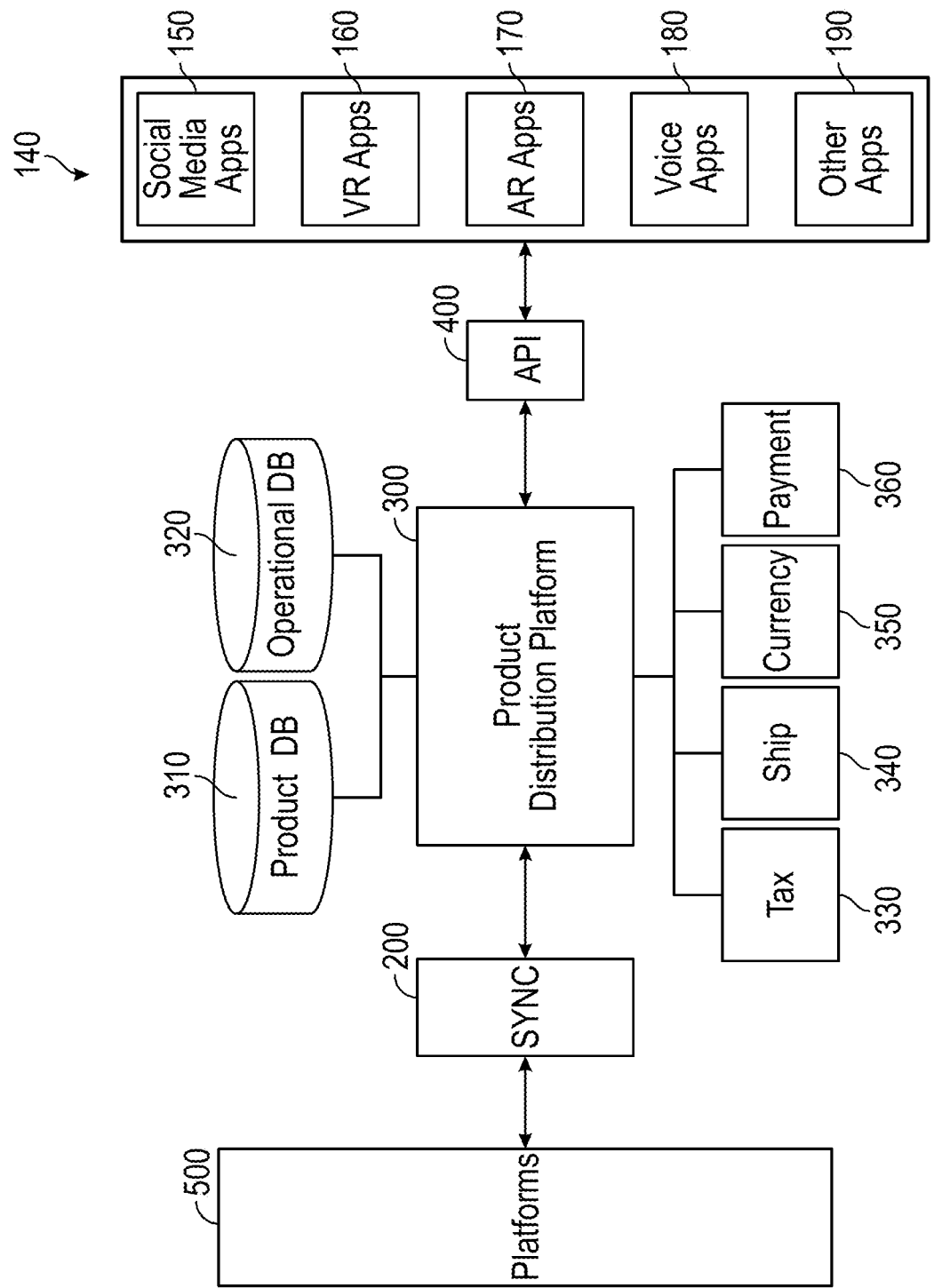
FIG. 2B is a schematic diagram of three sections of the multi-platform e-commerce distribution system: the synchronization service system, the product distribution platform, and the commerce graph Application Program Interface, which are all positioned between e-commerce platforms on one side and consumers on the other side, according to one implementation of the disclosed embodiments.

FIGS. 2A, 2B, and 3A-3C present illustrative diagrams of a headless multi-platform e-commerce distribution system 100. Referring now to FIG. 2A, an implementation of the multi-platform e-commerce distribution system 100 is shown that is positioned between on-line merchants 120 on one side and consumers 140 (e.g., applications and application developers through which end customers purchase products) on the other side. The applications 140 include, by way of example only, and not by way of limitation: website and mobile applications, social media applications 150, virtual reality applications 160, augmented reality applications 170, voice applications 180, and other applications 190. In some implementations, as shown in FIG. 2B, the three sections of the multi-platform e-commerce distribution system 100 include a synchronization service system 200, a product distribution platform 300, and an application program interface 400 (i.e., commerce graph). The three sections of the multi-platform e-commerce distribution system 100 are all positioned between e-commerce platforms 500 on one side and consumers 140 (e.g., applications and application developers through which end customers purchase products) on the other side. As also shown in FIG. 2B, the product distribution platform 300 includes a product database 310 and an operational database 320, as well as a tax information component 330, a shipping information component 340, a currency information component 350, and a payment information component 360.

As described above, there are many different e-commerce platforms including, by way of example only, and not by way of limitation: Shopify; Magento 1; Magento 2; Bigcommerce; Woocommerce; Ecwid; Lightspeed; Hybris; Demandware (Salesforce Commerce); Spree Commerce; 3D Cart; JigoShop; Kartrocket; Zepo; CoreCommerce; xCart; Websphere Commerce (IBM); ATG (Oracle Commerce); Volusion; PrestaShop; Intershop; Etsy; Handshake; SendOwl; Odoo; StoreHippo; Shoper; AliExpress; Adobe Business Catalyst; and ePages.

Each of these different e-commerce platforms has a different architecture, database structure, and method for extracting data, as well as other nuances unique to its system's architecture and maturity. Many of these different e-commerce platforms are old and archaic. Additionally, the different e-commerce platforms do not work well with others and, more significantly, there are a large number of different e-commerce platforms.

Notably, each of the different e-commerce platforms listed above allows for "integrations" to be built into the platform. Such integrations provide access into the e-commerce platforms and the data inside of the e-commerce platforms. In some implementations of the headless multi-platform e-commerce distribution system 100, the system integrates into many or all of the e-commerce platforms and leverages the cumulative effect of what may be accomplished with access to this magnitude of data in the e-commerce transaction marketplace.

In some implementations, the synchronization service system 200 of the headless multi-platform e-commerce distribution system 100 facilitates (1) the bi-directional "data translation" (i.e., "product ingestion"), and (2) the "order write-back." In other implementations, the synchronization service system 200 of the headless multi-platform e-commerce distribution system 100 facilitates single direction data translation in either (1) from the one or more merchants to the one or more e-commerce platforms, or (2) from the one or more e-commerce platforms to the one or more merchants. Notably, the synchronization service system 200 of the headless multi-platform e-commerce distribution system 100 provides unique new capabilities in the e-commerce transaction marketplace. In one or more implementations, the synchronization service system 200 of the headless multi-platform e-commerce distribution system 100 is dedicated to the timing and translation activities of data extraction from all the different e-commerce platforms into a format the product distribution platform 400 can ingest. This translation layer exists in the synchronization service system 200 to streamline operations of the headless multi-platform e-commerce distribution system 100.

Regardless of the structure of the data, the frequency of updates provided, or the number of different e-commerce platforms used, all of the relevant data that exits the synchronization service system 200 of the headless multi-platform e-commerce distribution system 100 then enters the repository of the product distribution platform 300 and is ready for consumption and utilization by the rest of the system. In this regard, the synchronization service system 200 acts as a bi-directional translation layer for order data coming into (i.e., ingestion) the headless multi-platform e-commerce distribution system 100 and exiting (i.e., order write-back) the headless multi-platform e-commerce distribution system 100.

When orders are created by the headless multi-platform e-commerce distribution system 100 (coming from an app via order write-back) the synchronization service system 200 translates these orders back into the format expected by the e-commerce platform of origin, before submitting them. This is the bi-directional nature of the synchronization service system 200 and the headless multi-platform e-commerce distribution system 100 in general. As these orders progress through the acceptance and fulfillment processes within the e-commerce platform of origin, the synchronization service system 200 of the headless multi-platform e-commerce distribution system 100 receives updated order data and translates this order data back into the order schema of the headless multi-platform e-commerce distribution system 100 before updating the order records of the headless multi-platform e-commerce distribution system 100.

The product distribution platform 300 of the headless multi-platform e-commerce distribution system 100 utilizes a custom marketplace schema that features a top-level product wrapper that contains all of the relevant information associated with that product. The top-level product wrapper is the source of basic metadata, minimum and maximum prices, and all possible product options like sizes, colors, materials, versions, or combinations thereof. The top-level product wrapper is not purchasable itself, but the merchant offers nested within the top-level product wrapper are the purchasable offer entities. Each nested offer is a product that may be made available by a merchant and is existent within the top-level product. A nested offer may contain product options and variants that are not available in other offers nested under the same top-level product wrapper. The offer entities consist of the variations of the product that a merchant 120 is actively selling. Two or more merchants 120 can sell the same variant combinations, completely different variations, or a mix of both. Additionally, merchants 120 can price their products independently of each other. The end developer may then determine which offer or offers to display or purchase.

Significantly, the product offers within the headless multi-platform e-commerce distribution system 100 are constantly updated, as their equivalent entities on the source e-commerce platform are updated. In some implementations, the headless multi-platform e-commerce distribution system 100 uses event listeners to help facilitate the updating. In other implementations, event listeners are not used by the headless multi-platform e-commerce distribution system 100 in the updating process. As such, a merchant 120 is not required to take any action to update the information associated with their product once it has been published within the headless multi-platform e-commerce distribution system 100. In this manner, when a merchant 120 modifies a product on the source e-commerce platform, the product offer on the headless multi-platform e-commerce distribution system 100 is updated automatically to reflect those changes. Additionally, if a product becomes out of stock on the source e-commerce platform, then the equivalent product offer on the headless multi-platform e-commerce distribution system 100 is also marked as out of stock, and will no longer be purchasable.

As described above and shown in FIGS. 3A, 3B, and 3C, the product schema of the headless multi-platform e-commerce distribution system 100 is normalized. Accordingly, regardless of the source of the product data, the product data is always translated into a single format. Thus, a developer only has to integrate with the schema of the headless multi-platform e-commerce distribution system 100, and then the developer can interface with all of the merchants 120 and the associated e-commerce platforms. Additionally, the headless multi-platform e-commerce distribution system 100 provides the technological improvement to developers of not requiring them to alter their codebases when the external platform data formats are updated or deprecated.

In some implementations, the product schema of the headless multi-platform e-commerce distribution system 100 is marketplace oriented such that it enables multiple merchants 120 to sell the same product. In such an implementation, a product at the top level is simply a data wrapper that contains basic product data and one or more nested product offers. These nested product offers are the purchasable entities in the headless multi-platform e-commerce distribution system 100. If two or more merchants 120 sell the same item, their items will be listed as offers of the top level product.

Accordingly, a developer does not need to search the product catalog for duplicate products. The developer can compare offers across multiple merchants 120 and choose which offer(s) they want to make available in their application. Additionally, the product schema of the headless multi-platform e-commerce distribution system 100 separates variants from SKUs (Stock Keeping Units), and provisions them in an easily consumable format. As defined herein, variants are the individual descriptors of a product like sizes, colors, materials, versions, or combinations thereof, while SKUs are the combinations of variants that together represent an item. The top level product wrapper lists all possible variants across all offers. The individual offers then list all possible variants for that offer.

By using the headless multi-platform e-commerce distribution system 100, a developer may immediately discover and consume all possible product variations without needing to dive into the nested product offers. Additionally, by using the headless multi-platform e-commerce distribution system 100, a developer is not required to parse variants from SKU data. The requirement of parsing variants from SKU data was a common technological limitation of previous attempts to work across e-commerce platforms.

Product level variants are a collection of all possible product variations across all merchant offers for a single product. At a top level, variants are options that may include but are not limited to sizes, colors, materials, versions, or combinations thereof. Within each variant is a collection of variant values such as small, medium, and large; or black, grey, and white. Making these variants available at the product level allows the developer to discover all possible variants without needing to iterate through the nested product offers.

Offers are a collection of a merchant's offerings of a product. Each offer is self-contained with all possible information about the product nested within it. Regarding another parameter, offer level variants are similar to product level variations; however, the collection is limited to only the product variations offered by a single merchant for a single product. Offer level variants allow a developer to enable option selection, and from there SKU composition, within their app. SKU composition is the process of combining variants to discover the SKU that matches the selected variants exactly. Regarding still another parameter, offer SKUs are combinations of variants that together equal a real product. Offer SKUs map directly to the purchasable entities on the external e-commerce platforms. When external orders are written back to the e-commerce platform, it is these SKUs that are being purchased.

In some implementations, the headless multi-platform e-commerce distribution system 100 enables the merging of product data. Data merging is the process of determining if two products are the same. When a product is ingested for the first time into the headless multi-platform e-commerce distribution system 100, the product is compared to existing products already in the repository of the headless multi-platform e-commerce distribution system 100. If a match is found, the product is added as an additional offer under the existing top-level product wrapper. If a match is not found, a new top-level product wrapper is created with the source product becoming the first offer of that product. A combination of product properties are used to determine if two products are the same. These include, by way of example only, and not by way of limitation: name, SKU (Stock Keeping Unit), brand, variation types, GTIN (Global Trade Item Number), ASIN (Amazon Standard Identification Number), UPC (Universal Product Code), EAN (European Article Number), JAN (Japanese Article Number), and media elements.

In one or more implementations, the headless multi-platform e-commerce distribution system 100 ingests three-dimensional spatial data. In such an implementation, the headless multi-platform e-commerce distribution system 100 collects all media elements during product ingestion, which can include both video and image elements, related to a product and its variants. Using these media elements, the headless multi-platform e-commerce distribution system 100 builds a visual profile of an individual product. This visual profile ultimately serves (but is not limited to) two primary purposes, product recognition and 3D image composition.

Product Recognition is the ability to determine what product or products are present in an image or video. To achieve this functionality, a product's visual profile is used to train machine learning algorithms how to recognize a product. The larger and more diverse the collection of product media is, the better the machine learning algorithms can be trained. The marketplace product schema used by the headless multi-platform e-commerce distribution system 100 provides technological advantages in this regard, since the system 100 has multiple merchants selling the same product. Accordingly, the headless multi-platform e-commerce distribution system 100 is able to collect a broader array of product media, since most merchants use product media that is unique.

Three-dimensional (3D) image composition is the ability to compose a 3D rendering of a product using the media elements collected for that product. This process involves training machine learning algorithms to build a 3D profile using the available media and then, essentially, fill in the gaps to complete the full 3D rendering. Since application developers collect spatial data on products in the physical world, the headless multi-platform e-commerce distribution system 100 is able to facilitate the recognition of products using the collected 3D spatial data.

In another implementation, users of applications associated with the headless multi-platform e-commerce distribution system 100 are another source of product media elements. Again, these product media elements may be used to train both product recognition and 3D image composition machine learning algorithms. In still another implementation, the headless multi-platform e-commerce distribution system 100 may incorporate 3D image scanning, associate with third-party partners, or provide merchants with the tools to scan their product catalog. These types of actual 3D product scanning are another source of 3D product data.

Advantageously, the headless multi-platform e-commerce distribution system 100 consumes all of the relevant product catalog data and transactional data due to the product ingestion and the positioning of the system 100 between on-line merchants 120 and applications 140. Others have attempted to obtain some of this data by "scraping" the information from websites without permission, or purchasing scraped information from others. However, this type of scraped information is undesirable for a variety of reasons. In this regard, scraped information is typically incomplete, outdated, and/or inaccurate. In fact, some scraped data from industry leaders is known to be accurate less than 50% of the time. Additionally, scraped information only attempts to provide product catalog data. Scraped information does not provide transactional data.

In contrast, the headless multi-platform e-commerce distribution system 100 provides access to instant, clean, accurate, product data, as well as transactional data. For example, one reason that scraped information is often outdated and inaccurate is that retailers change product information all the time, such as when a product's price changes or a product goes out of stock. Scraped information then becomes inaccurate whenever a change is made. Additionally, there are no notification systems to notify everyone that the scraped information has been changed, particularly since information "scraping" often occurs in an unauthorized manner. In implementations of the headless multi-platform e-commerce distribution system 100, the product catalog information is linked and automatically updated in the repository of the product distribution platform. Thus, the headless multi-platform e-commerce distribution system 100 automatically knows of an updated price, new image, stock quantities by size or color, or even new products.

Figure 4:
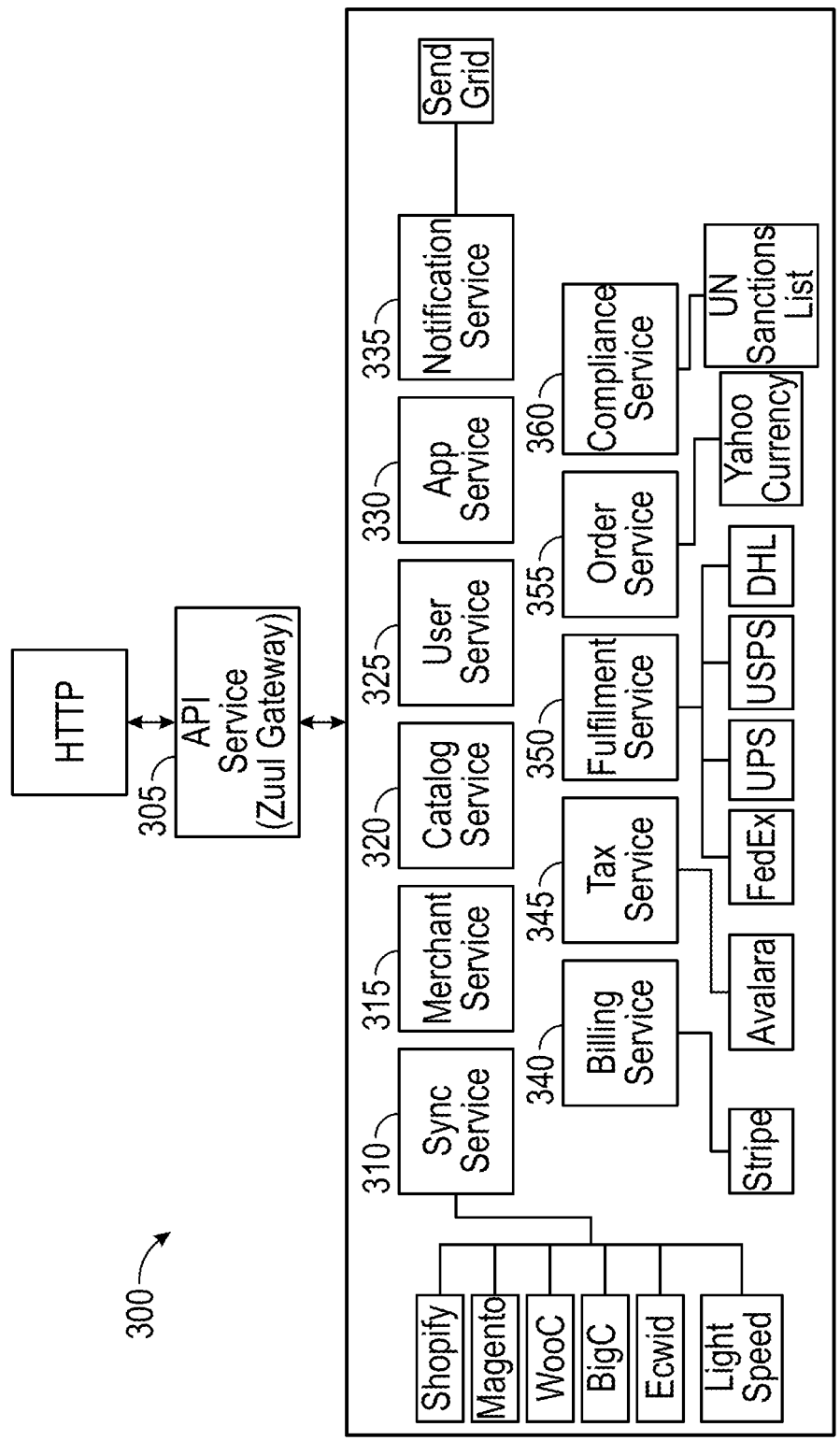
FIG. 4 is a schematic diagram of the product distribution platform section of the multi-platform e-commerce distribution system, which shows the microservices architecture, according to one implementation of the disclosed embodiments.

Referring now to FIG. 4, the headless multi-platform e-commerce distribution system 100 also includes a product distribution platform 300, as was previously discussed with respect to FIG. 2B. The product distribution platform 300 of the headless multi-platform e-commerce distribution system 100 is built with a microservices architecture. As shown in FIG. 4, the architecture of the system 100 includes several different components, such as API service component 305, synchronization service component 310, merchant service component 315, catalog service component 320, user service component 325, app service component 330, notification service component 335, billing service component 340, tax service component 345, fulfillment service component 350, order service component 355, and compliance service component 360.

The API service component 305 of the headless multi-platform e-commerce distribution system 100 is the gateway to the API. The API service component 305 is responsible for authorization/security and request routing. In some implementations, the API service component 305 is powered by Zuul (Netflix). In this regard, all authorized incoming requests are inspected and routed to the correct microservice by the API service component 305.

The synchronization service component 310 of the product distribution platform 300 is a bi-directional translation layer that (1) translates any incoming data into the equivalent schemas of the headless multi-platform e-commerce distribution system 100 and (2) translates any outgoing data of the headless multi-platform e-commerce distribution system 100 into the equivalent external schemas. The core functionalities of "product ingestion" and "order writeback" are found in this service.

In one aspect of the headless multi-platform e-commerce distribution system 100, the merchant service component 315 of the product distribution platform 300 maintains data related to merchants and their external stores. Additionally, the merchant service component 315 makes this data accessible to other services through internal APIs.

In another aspect of the headless multi-platform e-commerce distribution system 100, the catalog service component 320 of the product distribution platform 300 maintains and makes accessible all product and taxonomy related data. In some implementations of the headless multi-platform e-commerce distribution system 100, the catalog service component 320 is the only entry point to the product repository.

In still another aspect, the user service component 325 of the product distribution platform 300 maintains all accounts and account related data of the headless multi-platform e-commerce distribution system 100. Additionally, the user service component 325 of the product distribution platform 300 is responsible for defining a user's permissions. The defining of user permissions acts to limit the scope of the user's access to the services of the headless multi-platform e-commerce distribution system 100.

In yet another aspect, the app service component 330 of the product distribution platform 300 is responsible for maintaining and authorizing developers and their applications with the headless multi-platform e-commerce distribution system 100.

In some implementations, the notification service component 335 of the product distribution platform 300 is responsible for all notifications in the headless multi-platform e-commerce distribution system 100. In this regard, all app notifications, email notifications, SMS notifications, and push notifications are managed by the notification service component 335 of the product distribution platform 300.

In another aspect of some implementations, the billing service component 340 of the product distribution platform 300 maintains the relationships of merchants to their payout methods, and users to their payment methods, in the headless multi-platform e-commerce distribution system 100. All transactions and disbursements in the headless multi-platform e-commerce distribution system 100 are facilitated by this service.

In still another aspect of some implementations, the tax service component 345 of the product distribution platform 300 is responsible for maintaining merchant provided tax nexuses/rates. Additionally, the tax service component 345 of the product distribution platform 300 is also responsible for interacting with third-party tax services to provide automated tax rates. Furthermore, the tax service component 345 of the product distribution platform 300 is also responsible for inspecting virtual shopping carts to provide accurate tax data during the checkout process.

In yet another aspect of some implementations, the fulfillment service component 350 of the product distribution platform 300 is responsible for maintaining merchant provided shipping methods/rates. Additionally, the fulfillment service component 350 of the product distribution platform 300 is also responsible for interacting with third-party fulfillment services to provide automated shipping methods/rates. Furthermore, the fulfillment service component 350 of the product distribution platform 300 also inspects carts and provides a list of available shipping methods/rates during the checkout process.

In another aspect of the headless multi-platform e-commerce distribution system 100, the order service component 355 of the product distribution platform 300 powers the Checkout API. Additionally, the order service component 355 of the product distribution platform 300 is responsible for cart creation and order submission, as well as ongoing order updates.

In still another aspect, the compliance service component 360 of the product distribution platform 300 is responsible for preventing sanctioned entities from interacting with the headless multi-platform e-commerce distribution system 100. This service pulls data directly from the United Nations Sanctions List and validates both merchants and users of the headless multi-platform e-commerce distribution system 100 against this data during registration and ongoing activities.

Notably, the product distribution platform 300 of the headless multi-platform e-commerce distribution system 100 acts as a repository of buyable products. The repository of buyable products in the product distribution platform 300 contains top-level product wrappers, which includes product type characteristics such as simple, configurable, batched, downloadable, and virtual. Significantly, the product distribution platform 300 of the headless multi-platform e-commerce distribution system 100 acts as a repository of "buyable" products, not merely product catalog data. A repository of product catalog data is interesting for activities such as advertising, however, for the products to be "buyable" products, many surrounding services, e.g., fulfillment, tax, merchant info, and the like are required for those products to be buyable.

Referring again to FIG. 2B, the headless multi-platform e-commerce distribution system 100 also includes a commerce graph (API) 400. The commerce graph (API) 400 of the headless multi-platform e-commerce distribution system 100 is a single interface for any and all applications on the Internet to access products of the system 100. In some implementations of the headless multi-platform e-commerce distribution system 100, Internet applications (and their developers) are customers of the system 100. Accordingly, these customers consider the commerce graph (API) 400 to be the product they seek to purchase. In this regard, the commerce graph (API) 400 is a series of endpoints that enable developers to perform end-to-end product transactions. This includes the ability to render full product details, provide a cart experience, submit orders, and track the status of submitted orders. The components of the commerce graph (API) 400 include the catalog API, checkout API, cart, order submission, and order status.

The catalog API contains all of the relevant data and details about a given product in the headless multi-platform e-commerce distribution system 100. The catalog API is also referred to as the "product catalog" of the headless multi-platform e-commerce distribution system 100. The applications can request bits of data from the catalog API. The checkout API of the headless multi-platform e-commerce distribution system 100 includes a cart component and an order submission component. The cart component of the checkout API is used to create a cart and facilitate a transaction with an application. The creation of a cart by the checkout API is an intermediate step that is taken before an order may be accepted. The order submission component of the checkout API facilitates the ability to write the order back to the e-commerce platform of origin.

Additionally, the order status component of the headless multi-platform e-commerce distribution system 100 enables application developers with the data needed to provide order status to their users. Status data from the order status components may include, by way of example only, and not by way of limitation: order placed, order accepted, shipped, in transit, delivered, rejected, cancelled, returned, and the like. These types of order status data operate like notifications to the developer. The order state tells the system 100 how far along the order is in the fulfillment process. The fulfillment tracking data gives insight into the tracking numbers generated by the shipping company, and estimated delivery dates. In some implementations of the headless multi-platform e-commerce distribution system 100, order tracking employs the use of event listeners that are registered through e-commerce platforms, and notifies the system 100 whenever an order is updated.

The commerce graph (API) 400 of the headless multi-platform e-commerce distribution system 100 is a unified API that collects data across all integrated platforms. The collected data is then normalized into unified schemas, in which one is a product schema and one is an order schema. The data normalization process occurs anytime data originating from an external e-commerce platform is sent into the headless multi-platform e-commerce distribution system 100 or data originating from the headless multi-platform e-commerce distribution system 100 is sent into an external e-commerce platform.

Due to the unified data format that is created by the headless multi-platform e-commerce distribution system 100, application developers interacting with the commerce graph (API) 400 only need to integrate with one unified schema regardless of the original source or destination of the data. This is a major technological improvement over prior techniques in which custom integration was required from each combination of (1) original data source (2) data destination, and (3) product data. Accordingly, through the use of the headless multi-platform e-commerce distribution system 100, product data that originated on the e-commerce platform of Magento will appear in an identical format to product data that originated from the e-commerce platform of Shopify, and the like, across all supported e-commerce platforms.

Significantly, as the external e-commerce platforms (e.g., Magento, Shopify, and the like) update and retire their own APIs, the headless multi-platform e-commerce distribution system 100 performs the necessary actions to keep the integrations updated and performing. In this manner, application developers that are interacting with the commerce graph (API) 400 of the headless multi-platform e-commerce distribution system 100 do not need to modify their integrations over time as the external e-commerce platforms change. Instead, the headless multi-platform e-commerce distribution system 100 provides the technological improvement of accounting for updates to the integrations within the commerce graph (API) 400 so further actions are not required by the application developers.

Without the unified data format created by the headless multi-platform e-commerce distribution system 100, an application developer would be required to write separate code for each e-commerce platform included by their application. Beyond the activities required for the initial integrations, an application developer would also be required to keep updating their code base for each platform over time as the e-commerce platforms updated and retired their own APIs.

Figure 5:
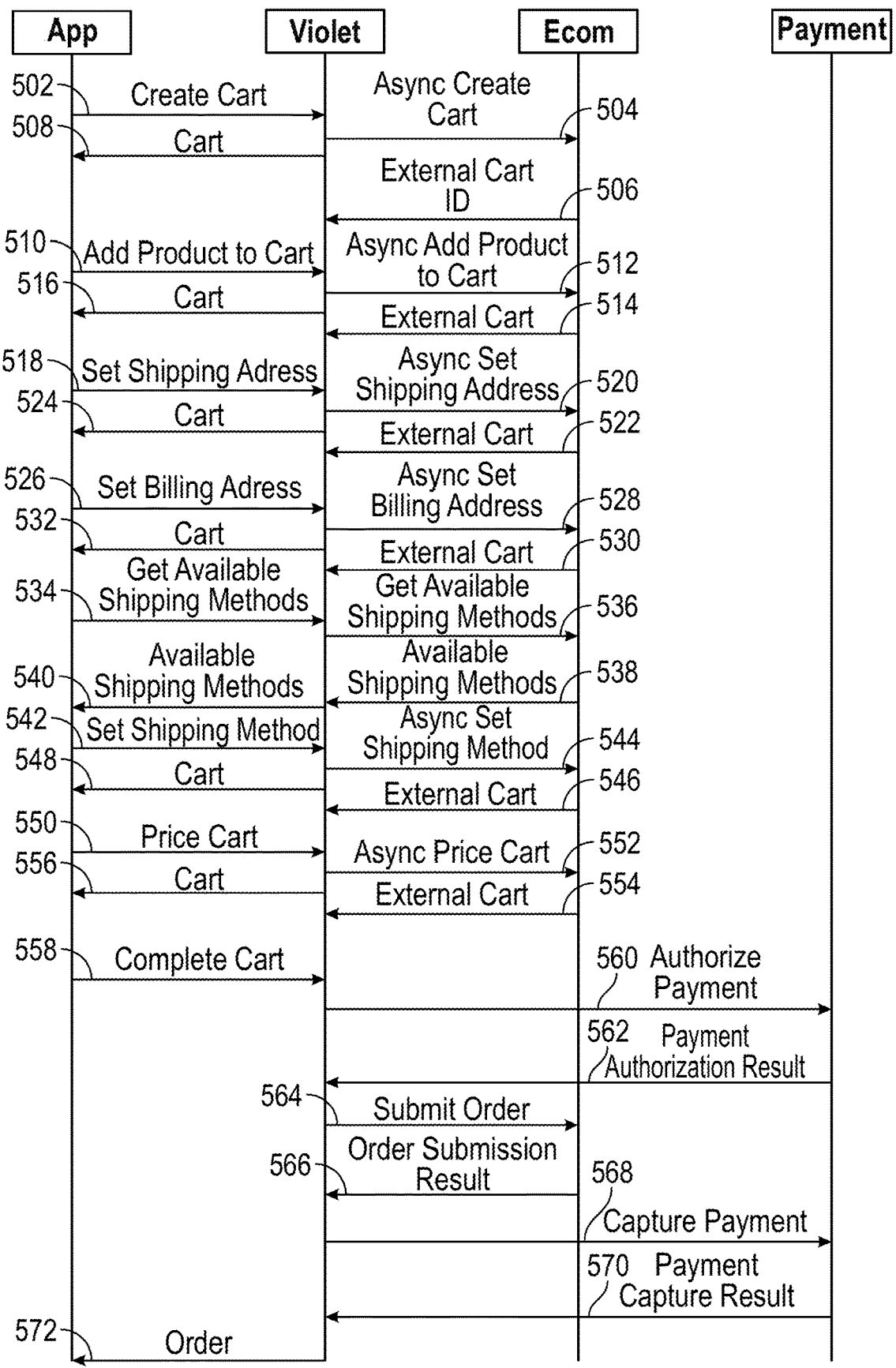
FIG. 5 is a logical diagram of transactional information for an "order write-back" in the multi-platform e-commerce distribution system, according to one implementation of the disclosed embodiments.

As shown in FIG. 5, the commerce graph (API) 400 of the headless multi-platform e-commerce distribution system 100 also enables "order write-back." The "order write-back" feature is what enables purchases to occur that are located on third-party applications. Without the "order write-back" feature, all a merchant may do is advertise within an application and redirect a potential purchaser back to a different application. By enabling the "order write-back" feature, the headless multi-platform e-commerce distribution system 100 becomes an engine of commerce.

Accordingly, the "order write-back" feature increases the conversion from purchase initiation to purchase completion, which adds new value to media entities. This increase in conversion changes the value exchange between internet properties, individuals, and sellers of goods. In this regard, the "order write-back" feature of the headless multi-platform e-commerce distribution system 100 enables a mere advertising scheme to be converted into a multi-platform e-commerce marketplace.

In the headless multi-platform e-commerce distribution system 100, there are two separate techniques for performing "order write-back" on the platform. The first "order write-back" method involves translating the order data from the headless multi-platform e-commerce distribution system 100 into the unique schema of the receiving e-commerce platform and directly submitting this data as a new order in one request. Since only one request is being made to the receiving e-commerce platform, all dynamic tax and shipping data must be obtained from third-party services at the time of cart pricing. To support this acquisition of the dynamic tax and shipping data, the headless multi-platform e-commerce distribution system 100 has direct integrations with tax and shipping APIs that are accessed each time the virtual shopping cart of the headless multi-platform e-commerce distribution system 100 is priced.

In another implementation of the headless multi-platform e-commerce distribution system 100, "order write-back" is performed on the platform by asynchronously creating and modifying an external cart on the receiving e-commerce platform during the checkout experience on the system 100. In this implementation, every action taken in the checkout flow of the headless multi-platform e-commerce distribution system 100, results in an immediate matching action being performed on the receiving e-commerce platform. This method enables the headless multi-platform e-commerce distribution system 100 to collect dynamic tax and shipping data directly from the receiving e-commerce platform without the need to rely on third-party services.

Accordingly, when a cart of the headless multi-platform e-commerce distribution system 100 is submitted, the "customer selected" or "default payment method" is authorized for the total amount of the order. Upon a successful response that the order was accepted by the receiving e-commerce platform, the payment authorization is captured and the customer is charged. If the capture of the payment authorization fails and subsequent retries fail, an order cancellation request is sent to the receiving e-commerce platform that automatically cancels the order. Finally, upon successful order payment, the funds are dispersed between the merchant, the application developer, and the headless multi-platform e-commerce distribution system 100. In the event of an order return within a pre-established remorse period, the dispersal of funds may be reversed.

Notably, in some implementations of the headless multi-platform e-commerce distribution system 100, event listeners are registered on the receiving e-commerce platform to enable the headless multi-platform e-commerce distribution system 100 to fully track the status and progression of each order as orders are fulfilled. The order records of the headless multi-platform e-commerce distribution system 100 are updated each time the external order is modified. Through this type of procedure using the headless multi-platform e-commerce distribution system 100, data such as shipment tracking numbers and order status may be made available to application developers and end customers.

The headless multi-platform e-commerce distribution system 100 provides seamless API integration. In this regard, the headless multi-platform e-commerce distribution system 100 collects and maintains accurate data in a uniform format across all platforms, which is the most complex aspect of the "order write-back" feature. Each e-commerce platform has unique requirements that must be met before an order will be accepted. Accordingly, the required data is collected during the checkout process in the headless multi-platform e-commerce distribution system 100 and/or from existing account configurations in the headless multi-platform e-commerce distribution system 100. The required data is then seamlessly interfaced with the unique platform schemas, all while maintaining a consistent user experience on the headless multi-platform e-commerce distribution system 100.

Receiving e-commerce platforms that accept orders in just one request requires the additional actions by the headless multi-platform e-commerce distribution system 100 of obtaining real-time shipping and tax rates on the fly while pricing the cart in order to generate and submit accurate price data. To receiving e-commerce platforms that support the external cart method, the headless multi-platform e-commerce distribution system 100 maintains a consistent state, and submits data at each step in the checkout flow.

In some implementations, the headless multi-platform e-commerce distribution system 100 creates and maintains an asynchronous external cart that maps to an internal cart in headless multi-platform e-commerce distribution system 100. In such an implementation, each call made to the cart endpoint in the headless multi-platform e-commerce distribution system 100 results in an immediate call in the background to the equivalent endpoint in the receiving e-commerce platform. In one example, when a request is made to create a new empty cart in the headless multi-platform e-commerce distribution system 100, an asynchronous request is made to create a new empty cart in the receiving e-commerce platform (e.g., Shopify). The headless multi-platform e-commerce distribution system 100 then maintains a connection with that new external cart, and as additional requests are performed on the internal cart of the headless multi-platform e-commerce distribution system 100 (i.e., adding a product to the cart), that same action is performed on the external cart. Specifically, the data is translated from the unified schema of the headless multi-platform e-commerce distribution system 100 into the unique schema of the receiving e-commerce platform (e.g., Shopify). The technological improvement of this process is that the headless multi-platform e-commerce distribution system 100 can obtain accurate pricing and shipping data directly from the external cart, instead of being required to interact with third-party shipping and tax API's to obtain that data.

This process of creating and maintaining an asynchronous external cart using the headless multi-platform e-commerce distribution system 100 is shown in FIG. 5. At 502, the user of the application 140 instructs the multi-platform distribution system 100 to create an internal cart on the multi-platform distribution system 100. At 504, the multi-platform distribution system 100 asynchronously instructs the receiving e-commerce platform 500 to create an external cart. At 506, the receiving e-commerce platform 500 sends an external cart ID back to the multi-platform distribution system 100. At 508, the multi-platform distribution system 100 then sends the created cart information to the application 140.

At 510, the user of the application 140 instructs the multi-platform distribution system 100 to add a product to the internal cart on the multi-platform distribution system 100. At 512, the multi-platform distribution system 100 asynchronously instructs the receiving e-commerce platform 500 to add a product to the external cart. At 514, the receiving e-commerce platform 500 sends a confirmation of the product addition to the external cart back to the multi-platform distribution system 100. At 516, the multi-platform distribution system 100 then sends the confirmation of the product addition back to the application 140.

At 518, the user of the application 140 instructs the multi-platform distribution system 100 to set the shipping address for the product on the multi-platform distribution system 100. At 520, the multi-platform distribution system 100 asynchronously instructs the receiving e-commerce platform 500 to set the shipping address for the product on the external cart. At 522, the receiving e-commerce platform 500 sends a confirmation of setting the shipping address for the product back to the multi-platform distribution system 100. At 524, the multi-platform distribution system 100 then sends the confirmation of setting the shipping address for the product back to the application 140.

At 526, the user of the application 140 instructs the multi-platform distribution system 100 to set the billing address for the product on the multi-platform distribution system 100. At 528, the multi-platform distribution system 100 asynchronously instructs the receiving e-commerce platform 500 to set the billing address for the product on the external cart. At 530, the receiving e-commerce platform 500 sends a confirmation of setting the billing address for the product back to the multi-platform distribution system 100. At 532, the multi-platform distribution system 100 then sends the confirmation of setting the billing address for the product back to the application 140.

At 534, the user of the application 140 instructs the multi-platform distribution system 100 to request available shipping methods for the product on the multi-platform distribution system 100. At 536, the multi-platform distribution system 100 asynchronously instructs the receiving e-commerce platform 500 to request available shipping methods for the product on the external cart. At 538, the receiving e-commerce platform 500 sends back the available shipping methods for the product back to the multi-platform distribution system 100. At 540, the multi-platform distribution system 100 then sends back the available shipping methods for the product back to the application 140.

At 542, the user of the application 140 instructs the multi-platform distribution system 100 to set the shipping method for the product on the multi-platform distribution system 100. At 544, the multi-platform distribution system 100 asynchronously instructs the receiving e-commerce platform 500 to set the shipping method for the product on the external cart. At 546, the receiving e-commerce platform 500 sends a confirmation of setting the shipping method for the product back to the multi-platform distribution system 100. At 548, the multi-platform distribution system 100 then sends the confirmation of setting the shipping method for the product back to the application 140.

At 550, the user of the application 140 instructs the multi-platform distribution system 100 to request the cart price for the product on the multi-platform distribution system 100. At 552, the multi-platform distribution system 100 asynchronously instructs the receiving e-commerce platform 500 to request the cart price for the product on the external cart. At 554, the receiving e-commerce platform 500 sends a confirmation of requesting the cart price for the product back to the multi-platform distribution system 100. At 556, the multi-platform distribution system 100 then sends the confirmation of requesting the cart price for the product back to the application 140.

At 550, the user of the application 140 instructs the multi-platform distribution system 100 to request the cart completion for the product on the multi-platform distribution system 100. At 560, the multi-platform distribution system 100 instructs payment system 700 to authorize payment for the product on the internal cart. At 562, the payment system 700 sends payment authorization results for the product in the internal cart back to the multi-platform distribution system 100. At 564, the multi-platform distribution system 100 then sends a submit order instruction to the receiving e-commerce platform 500. At 566, the receiving e-commerce platform 500 then sends order submission results back to the multi-platform distribution system 100. At 568, the multi-platform distribution system 100 sends a request to the payment system 700 to capture payment for the product on the internal cart. At 570, the payment system 700 sends payment capture results for the product in the internal cart back to the multi-platform distribution system 100. Finally, at 572 the multi-platform distribution system 100 then sends the order back to the application 140.

In another implementation of the headless multi-platform e-commerce distribution system 100 configured to interface with a receiving e-commerce platform 500 that does not support an asynchronous external cart, the system 100 enables merchant configuration of necessary shipping, tax, and payment data for order write-back. In previous e-commerce platforms, to collect the necessary shipping, tax, and payment data, a merchant was required to go through an onboarding process that involved duplicating all of the relevant shipping, tax, and payment data they had already taken to configure on their e-commerce platform. This was a significant technological limitation. Advantageously, in an implementation of the headless multi-platform e-commerce distribution system 100 configured to interface with a receiving e-commerce platform 500, the system 100 combines data obtained from the merchant's existing platform with connections to third-party tax and shipping APIs. The connections to third-party tax and shipping APIs generate the available shipping methods, as well as automatically calculating the tax and shipping rates, without the need for additional configuration. Accordingly, in this implementation of the headless multi-platform e-commerce distribution system 100, instead of configuring a payment gateway, a direct connection is made to the merchant's bank account so that funds may be dispersed directly to the merchant.

In some implementations of the headless multi-platform e-commerce distribution system 100, when an order occurs, the system 100 may receive an immediate percentage of the transaction. If the purchase was through a third party (e.g., Facebook or Instagram), the third party may also be paid a percentage. In this implementation, the remainder of the purchase price goes to the original seller of the product. This is a unique revenue splitting architecture that is part affiliate selling, part drop shipping, and part retailing. Notably, this unique revenue splitting architecture provides new ways for individuals, companies, application developers, and merchants to participate in the exchange of goods.

In one or more implementations, when an order is placed through the headless multi-platform e-commerce distribution system 100, a transaction is created for each non-empty bag in the order. As defined herein, a bag contains one or more products provided by a single merchant. The total funds of each transaction are split between the merchant 120, the headless multi-platform e-commerce distribution system 100, and the application developer 140 (who is developing applications designed to interface with the system 100). In the event of a return of a product purchased using the headless multi-platform e-commerce distribution system 100, the transaction payment split is reversed, with each party automatically returning their portion of the funds to the original payment source.

In some implementations, the headless multi-platform e-commerce distribution system 100 tracks whether a product has been returned, as well as any actions related to that return, such as a refund of the transaction funds. For example, in the situation where a customer chooses to return one or more products to the merchant 120, a reversal of the transaction payment split is initiated.

In some implementations, this reversal of the transaction payment split is automatically triggered by the act of the merchant flagging the order as returned within their e-commerce platform. In such an implementation, order event listeners registered on the e-commerce platform notify the headless multi-platform e-commerce distribution system 100 of the one or more products being returned to the merchant 120. The headless multi-platform e-commerce distribution system 100 then initiates the transaction reversal with the payment service provider. Upon completion of the transaction reversal, the status of the order is updated on the e-commerce platform to flag it as refunded.

In some implementations of the headless multi-platform e-commerce distribution system 100, when a customer adds a new payment method (e.g., credit card, debit card, bank account, and the like) to their account in the system 100, the payment method is "tokenized" and made available for both immediate and future use, as well as enabling multi-merchant payment check-out. Accordingly, when the customer uses this payment method to making a purchase, the payment method is charged and the transaction funds are directly sent to the merchant's payout method, less any service fees of the headless multi-platform e-commerce distribution system 100. Significantly, when using the headless multi-platform e-commerce distribution system 100, funds are taken from the customer's payment method at the time of payment capture, and sent directly to the merchant's payout method, without first escrowing the funds in any intermediary account.

There are three technological improvements that are achieved by using a 'vaulting' technique within the headless multi-platform e-commerce distribution system 100. First, by using this payment vaulting technique, there is only one transaction fee associated with the transfer of funds from a customer to a merchant 120. In contrast, if the merchant's funds were first collected from the customer by an intermediary system, and then later disbursed to the merchant 120 from the intermediary system, there would be an ACH transaction fee in addition to the initial card processing fee. Second, by using this payment vaulting technique, the merchant's portion of the product transaction proceeds is made immediately available to the merchant 120. Third, by using this payment vaulting technique, the headless multi-platform e-commerce distribution system 100 (or any other intermediary system) never acts as an escrow account that is responsible for the holding and protection for the merchant's product transaction proceeds.

Due to the unique configuration of the headless multi-platform e-commerce distribution system 100, all "customer payment methods" and all "merchant payout methods" are vaulted within the same payment gateway (e.g., Stripe, Braintree, and the like). Accordingly, there is no need to create a new unique payment token for each merchant 120. Thus, the headless multi-platform e-commerce distribution system 100 enables multi-merchant check-out transactions. In the headless multi-platform e-commerce distribution system 100, when a customer adds a new payment method (e.g., credit/debit card) that method is also vaulted in the same payment gateway (e.g., Stripe, Braintree, and the like) as the merchants 120. Accordingly, this single gateway approach of the headless multi-platform e-commerce distribution system 100 enables a user to only have to vault their unique payment method once, and that unique payment method can be used across all merchants.

Past attempts at multi-merchant applications involved integrating with multiple payment gateways, and required the user to enter their card details each time they shopped from a new merchant. Past attempts at multi-merchant applications also required the merchant to provide access to their account on that payment gateway. Accordingly, when a customer's payment method was vaulted to a merchant's account, it would only be available for future use when that customer was purchasing from that particular merchant. Thus, such past attempts at vaulted payment methods could not be shared across merchants or payment gateways, and required the customer to re-enter their card details each time they shopped from a new merchant. In contrast, the headless multi-platform e-commerce distribution system 100 uses a single gateway so that the customer only ever needs to enter their "customer payment method" details once per unique "customer payment method."

In at least one implementation, the payment source from which funds originate when an order is placed is a secure token that represents a customer's payment method. This tokenized payment method may be a credit card or a bank account. There is no limit to the number of unique payment methods (i.e., tokens) a user can have. When a transaction order is placed with the headless multi-platform e-commerce distribution system 100, the customer selected defaulted payment method is authorized. The full amount is then charged for each bag on behalf of the merchant's payment destination. Notably, the bags do not have to be from the same merchant 120 since the headless multi-platform e-commerce distribution system 100 enables concurrent multi-merchant shopping with a single order check-out. Accordingly, in the headless multi-platform e-commerce distribution system 100, a purchaser may shop and create a first bag of products from a first merchant, shop and create a second bag of products from a second merchant, shop and create a third bag of products from a third merchant, and then check-out with a single multi-merchant check-out transaction.

In some implementations of the headless multi-platform e-commerce distribution system 100, the merchant payment destination is the tokenized representation of the source merchant's payout method, which is typically a bank account. This tokenized payout method is where a merchant's portion of the transaction funds are sent. When a customer's payment method is charged for the total amount of the one or more bags, the charge is made on behalf of the merchant's payout method. Thus, the funds from the customer's payment method (less any application fees of the headless multi-platform e-commerce distribution system 100), are sent directly to the merchant 120 without requiring any intermediary accounts to be escrowed, as is necessary with some alternative transaction systems.

In at least one implementation, the headless multi-platform e-commerce distribution system 100 deducts application fees from the transaction order charge. The application fees may include the service fee to the headless multi-platform e-commerce distribution system 100 and the commission earned by the developer who originated the sale. For example, in some implementations, if the total price of the products in a "bag" total was $100, and the merchant 120 agreed to a 15% total commission, then the total amount sent to the merchant's payment destination would be $85, with the remaining $15 being collected by the headless multi-platform e-commerce distribution system 100.

The commission owed to the developer 140 is deducted from the $15 collected by the headless multi-platform e-commerce distribution system 100 and sent to the developer's payment destination, along with any other payments, on a rolling basis. The developer's payment destination is the tokenized representation of the developer's payout method, which is typically a bank account. This payout method is where a developer's portion of the transaction proceeds is sent.

In some implementations, the headless multi-platform e-commerce distribution system 100 creates a two-sided e-commerce marketplace with a supply side and a demand side. The supply side of the e-commerce marketplace includes merchants 120 and manufacturers that sell products. These supply side companies can use margin to incentivize different retailers or application developers 140 to sell their product.

In some implementations of the headless multi-platform e-commerce distribution system 100, the suppliers (e.g., merchants 120) are able to individually modify the rate of revenue they are willing to give to the demand-side individual or company that helped generate the transaction. These supply side companies may now individually barter, based on their product popularity and their location within the supply chain, the rate of revenue they are willing to offer on a competitive open market platform. This variable rate of revenue may range anywhere from about 10% to 70% or higher. Merchants can increase the rate of revenue they are willing to offer to incentivize the demand-side individuals or companies to want to sell their product. Merchants can also decrease the rate of revenue they are willing to offer, to increase their transaction payout from the demand-side individuals or companies if, for example, their products are extremely popular and, thus, no additional incentives are required.

Accordingly, in one or more implementations of the headless multi-platform e-commerce distribution system 100, certain relationships between supply-side companies and demand-side companies will be created within this new two-sided e-commerce marketplace, as companies identify partners and ways to drive new sales and conversions for merchants. The headless multi-platform e-commerce distribution system 100 facilitates these relationships by allowing a supplier (e.g., merchants 120) to set a "default" percentage rate of revenue, and also to create a "custom" percentage rate of revenue for a single company or even a single product.

In one such implementation of the headless multi-platform e-commerce distribution system 100, if XYZ company has a really desirable new product, an application developer may really want to sell this product, and be willing to collect only 30% of the proceeds from all those sales, as opposed to the 50% margin that some retailers get. The headless multi-platform e-commerce distribution system 100 facilitates this relationship between XYZ company and ABC application by enabling ABC application to sell this new product at a "custom" percentage rate of 30% of the revenue for this specific XYZ company product.

Conversely, the demand-side companies in the two-sided e-commerce marketplace created by the headless multi-platform e-commerce distribution system 100 are the consumers 140 (e.g., applications and application developers through which end customers purchase products) the headless multi-platform e-commerce distribution system 100. These consumers 140 are often Internet application developers. For this demand-side of the two-sided e-commerce marketplace, these application developers 140 look for the supplier (e.g., merchants 120) that provides them with the highest potential for earnings (i.e., percentage rate of revenue) on each transaction. In some implementations of the headless multi-platform e-commerce distribution system 100, the consumers 140/developers may reach out to certain suppliers (e.g., merchants 120) to try to negotiate a better percentage rate of revenue on each transaction.

In this manner, the headless multi-platform e-commerce distribution system 100 creates this new two-sided e-commerce marketplace based upon the rate of margin a company is willing to give up in exchange for the sale. This capability has not previously existed in the e-commerce marketplace. In some implementations of the headless multi-platform e-commerce distribution system 100, a talented developer/consumer 140 may develop a large audience, as well as high level of conversions (i.e., ratio of product views to product sales) based upon the communities that they serve. The headless multi-platform e-commerce distribution system 100 provides a mechanism for such a talented developer/consumer 140 to obtain a better percentage rate of revenue on each transaction from the suppliers/merchants 120 who are desirous to work with such a talented developer/consumer 140.

Notably, many different types of applications 140 may interact with the headless multi-platform e-commerce distribution system 100. As described above, different e-commerce platforms interface with the synchronization service system 200 of the headless multi-platform e-commerce distribution system 100 as part of the product ingestion process. Corresponding different applications are configured to interface with the commerce graph 400 of the headless multi-platform e-commerce distribution system 100 as part of the application program interface procedure. These different applications may be categorized into groups, including, by way of example only, and not by way of limitation: Web apps, mobile apps, voice apps, messenger apps, augmented reality apps, and virtual reality apps.

Web apps are applications that exist almost entirely in a web interface, such as Facebook's website and Google's website (e.g., Google search). Mobile apps are applications that exist via mobile devices, such as Instagram and Snapchat. Voice apps are voice assistance applications that exist in various forms. Through voice services, companies create apps that enable users to buy products via voice commands, such as Amazon Echo, Amazon Alexa, Amazon Lex integration, Google Home, Google Cloud Dialog Flow, Cortana Intelligence Services integration, and Cortana native integration.

Additionally, there are various applications that leverage the power of messaging (chat/bot/messages), some of which may or may not be automated. Such applications include, by way of example only, and not by way of limitation: Facebook Messenger, Kik, WhatsApp, Signal, and Mezi.

Furthermore, while augmented reality applications and virtual reality applications are still early in their development and market penetration, these applications can create a unique experience in conjunction with the headless multi-platform e-commerce distribution system 100 to enable individuals to buy products in the augmented reality overlay or virtual reality environment. A virtual reality application may create a virtual reality environment in which product data is pulled to facilitate a transaction that is native to the virtual reality environment by integrating with the headless multi-platform e-commerce distribution system 100.

Figure 6:
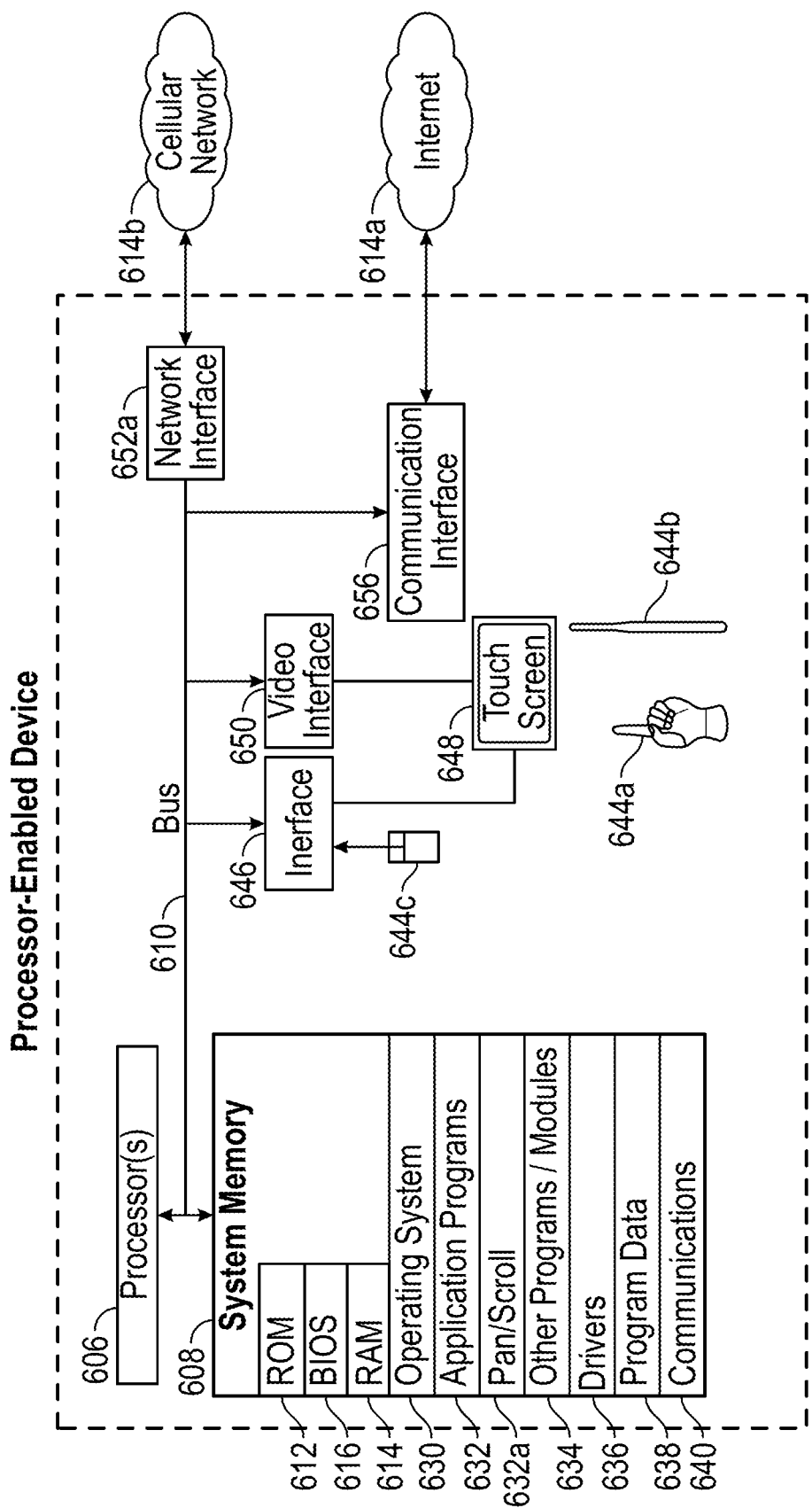
FIG. 6 is a block diagram of an example processor-based device used to implement one or more of the electronic devices described herein.

For use in conjunction with the headless multi-platform e-commerce distribution system 100, FIG. 6 shows a processor-based device suitable for implementing computing infrastructure for the suppliers/merchants 120 and the developer/consumer 140, as well as the processor-based desktop and mobile devices that support the applications created by the developer for end user purchasers. Although not required, some portion of the implementations will be described in the general context of processor-executable instructions or logic, such as program application modules, objects, or macros being executed by one or more processors. Those skilled in the relevant art will appreciate that the described implementations, as well as other implementations, can be practiced with various processor-based system configurations, including handheld devices, such as smartphones and tablet computers, wearable devices, multiprocessor systems, microprocessor-based or programmable consumer electronics, personal computers ("PCs"), network PCs, minicomputers, mainframe computers, and the like.

In the headless multi-platform e-commerce distribution system 100, the processor-based device may, for example, take the form of a smartphone or wearable smart glasses, which includes one or more processors 606, a system memory 608 and a system bus 610 that couples various system components including the system memory 608 to the processor(s) 606. The processor-based device will, at times, be referred to in the singular herein, but this is not intended to limit the implementations to a single system, since in certain implementations, there will be more than one system or other networked computing device involved. Non-limiting examples of commercially available systems include, but are not limited to, ARM processors from a variety of manufactures, Core microprocessors from Intel Corporation, U.S.A., PowerPC microprocessor from IBM, Sparc microprocessors from Sun Microsystems, Inc., PA-RISC series microprocessors from Hewlett-Packard Company, and 68xxx series microprocessors from Motorola Corporation.

The processor(s) 606 in the processor-based devices of the headless multi-platform e-commerce distribution system 100 may be any logic processing unit, such as one or more central processing units (CPUs), microprocessors, digital signal processors (DSPs), application-specific integrated circuits (ASICs), field programmable gate arrays (FPGAs), and the like. Unless described otherwise, the construction and operation of the various blocks shown in FIG. 6 are of conventional design. As a result, such blocks need not be described in further detail herein, as they will be understood by those skilled in the relevant art.

The system bus 610 in the processor-based devices of the headless multi-platform e-commerce distribution system 100 can employ any known bus structures or architectures, including a memory bus with memory controller, a peripheral bus, and a local bus. The system memory 608 includes read-only memory ("ROM") 612 and random access memory ("RAM") 614. A basic input/output system ("BIOS") 616, which can form part of the ROM 612, contains basic routines that help transfer information between elements within processor-based device, such as during start-up. Some implementations may employ separate buses for data, instructions and power.

The processor-based device of the headless multi-platform e-commerce distribution system 100 may also include one or more solid state memories; for instance, a Flash memory or solid state drive (SSD), which provides nonvolatile storage of computer-readable instructions, data structures, program modules and other data for the processor-based device. Although not depicted, the processor-based device can employ other nontransitory computer- or processor-readable media, for example, a hard disk drive, an optical disk drive, or a memory card media drive.

Program modules in the processor-based devices of the headless multi-platform e-commerce distribution system 100 can be stored in the system memory 608, such as an operating system 630, one or more application programs 632, other programs or modules 634, drivers 636 and program data 638.

The application programs 632 may, for example, include panning/scrolling 632a. Such panning/scrolling logic may include, but is not limited to, logic that determines when and/or where a pointer (e.g., finger, stylus, cursor) enters a user interface element that includes a region having a central portion and at least one margin. Such panning/scrolling logic may include, but is not limited to, logic that determines a direction and a rate at which at least one element of the user interface element should appear to move, and causes updating of a display to cause the at least one element to appear to move in the determined direction at the determined rate. The panning/scrolling logic 632a may, for example, be stored as one or more executable instructions. The panning/scrolling logic 632a may include processor and/or machine executable logic or instructions to generate user interface objects using data that characterizes movement of a pointer, for example, data from a touch-sensitive display or from a computer mouse or trackball, or other user interface device.

The system memory 608 in the processor-based devices of the headless multi-platform e-commerce distribution system 100 may also include communications programs 640, for example, a server and/or a Web client or browser for permitting the processor-based device to access and exchange data with other systems such as user computing systems, Web sites on the Internet, corporate intranets, or other networks as described below. The communications program 640 in the depicted implementation is markup language based, such as Hypertext Markup Language (HTML), Extensible Markup Language (XML) or Wireless Markup Language (WML), and operates with markup languages that use syntactically delimited characters added to the data of a document to represent the structure of the document. A number of servers and/or Web clients or browsers are commercially available such as those from Mozilla Corporation of California and Microsoft of Washington.

While shown in FIG. 6 as being stored in the system memory 608, operating system 630, application programs 632, other programs/modules 634, drivers 636, program data 638 and server and/or browser can be stored on any other of a large variety of nontransitory processor-readable media (e.g., hard disk drive, optical disk drive, SSD and/or flash memory).

A user of a processor-based device in the headless multi-platform e-commerce distribution system 100 can enter commands and information via a pointer, for example, through input devices such as a touch screen 648 via a finger 644a, stylus 644b, or via a computer mouse or trackball 644c which controls a cursor. Other input devices can include a microphone, joystick, game pad, tablet, scanner, biometric scanning device, and the like. These and other input devices (i.e., "I/O devices") are connected to the processor(s) 606 through an interface 646 such as a touch-screen controller and/or a universal serial bus ("USB") interface that couples user input to the system bus 610, although other interfaces such as a parallel port, a game port or a wireless interface or a serial port may be used. The touch screen 648 can be coupled to the system bus 610 via a video interface 650, such as a video adapter to receive image data or image information for display via the touch screen 648. Although not shown, the processor-based device can include other output devices, such as speakers, vibrator, haptic actuator or haptic engine, and the like.

The processor-based devices of the headless multi-platform e-commerce distribution system 100 operate in a networked environment using one or more of the logical connections to communicate with one or more remote computers, servers and/or devices via one or more communications channels, for example, one or more networks 614a, 614b. These logical connections may facilitate any known method of permitting computers to communicate, such as through one or more LANs and/or WANs, such as the Internet, and/or cellular communications networks. Such networking environments are well known in wired and wireless enterprise-wide computer networks, intranets, extranets, the Internet, and other types of communication networks including telecommunications networks, cellular networks, paging networks, and other mobile networks.

When used in a networking environment, the processor-based devices of the headless multi-platform e-commerce distribution system 100 may include one or more network, wired or wireless communications interfaces 652a, 656 (e.g., network interface controllers, cellular radios, WI-FI radios, Bluetooth radios) for establishing communications over the network, for instance, the Internet 614a or cellular network 614b.

In a networked environment, program modules, application programs, or data, or portions thereof, can be stored in a server computing system (not shown). Those skilled in the relevant art will recognize that the network connections shown in FIG. 6 are only some examples of ways of establishing communications between computers, and other connections may be used, including wirelessly.

For convenience, the processor(s) 606, system memory 608, and network and communications interfaces 652a, 656 are illustrated as communicably coupled to each other via the system bus 610, thereby providing connectivity between the above-described components. In alternative implementations of the processor-based device, the above-described components may be communicably coupled in a different manner than illustrated in FIG. 6. For example, one or more of the above-described components may be directly coupled to other components, or may be coupled to each other, via intermediary components (not shown). In some implementations, system bus 610 is omitted, and the components are coupled directly to each other using suitable connections.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), one or more communicative link(s) through one or more wireless communication protocol(s), and/or optical pathways (e.g., optical fiber), and exemplary communicative couplings include, but are not limited to, electrical couplings, magnetic couplings, wireless couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other portable and/or wearable electronic devices, not necessarily the exemplary wearable electronic devices generally described above.

For instance, the foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs executed by one or more computers (e.g., as one or more programs running on one or more computer systems), as one or more programs executed by one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A multi-platform e-commerce system with an asynchronous virtual cart, the system comprising:
   one or more processors; and
   a memory device storing a set of instructions that when executed by the one or more processors, causes the one or more processors to:
   create an internal virtual cart associated with the multi-platform e-commerce system;

in response to the creation of the internal virtual cart, create an external asynchronous virtual cart associated with one or more single e-commerce platforms;

upon receiving an incoming product order request from one or more third-party applications, add the product order request to the internal virtual cart;

in response to adding the product order request to the internal virtual cart, send instructions to add the product order request to the external asynchronous virtual cart associated with the one or more single e-commerce platforms;

inspect the external asynchronous virtual carts and provide a list of available shipping methods and rates during the checkout process;

dynamically collect real-time tax and shipping data directly from the one or more single e-commerce platforms which enable generation and submission of accurate price data;

upon receiving an order completion instruction from the one or more third-party applications, send payment authorization to a payment gateway;

upon receiving payment authorization results from the payment gateway, submit a product order to the one or more single e-commerce platforms;

send payment capture instructions to the payment gateway;

receive payment capture results from the payment gateway; and after payment is captured, send order to distribute the product, wherein the system enables merchants to set default rates of revenue being offered to third-party application developers that helped generate the transaction between the third-party application developers, and enables merchants to set custom rates of revenue being offered to third-party application developers that helped generate the transaction between the third-party application developers for specific products.

2. The system of claim 1, wherein the memory device further stores a set of instructions that when executed by the one or more processors, causes the one or more processors to:

upon receiving a second incoming product order request from a second third-party application, add the second product order request to the internal virtual cart; and in response to adding the second product order request to the internal virtual cart, send instructions to add the second product order request to the external asynchronous virtual cart.

3. The system of claim 2, wherein the memory device further stores a set of instructions that when executed by the one or more processors, causes the one or more processors to:

upon receiving an another incoming product order request from another third-party application, add the another product order request to the internal virtual cart; and in response to adding the another product order request to the internal virtual cart, send instructions to add the another product order request to the external asynchronous virtual cart.

4. The system of claim 1, wherein the memory device further stores a set of instructions that when executed by the one or more processors, causes the one or more processors to:

upon receiving set shipping address instructions from another third-party application, send the set shipping address instructions to the internal virtual cart; and in response to sending the set shipping address instructions to the internal virtual cart, send instructions to set a shipping address to the external asynchronous virtual cart.

5. The system of claim 1, wherein the memory device further stores a set of instructions that when executed by the one or more processors, causes the one or more processors to:

upon receiving set billing address instructions from another third-party application, send the set billing address instructions to the internal virtual cart; and in response to sending the set billing address instructions to the internal virtual cart, send instructions to set a billing address to the external asynchronous virtual cart.

6. The system of claim 1, wherein the memory device further stores a set of instructions that when executed by the one or more processors, causes the one or more processors to:

upon receiving set shipping method instructions from another third-party application, send the set shipping method instructions to the internal virtual cart; and in response to sending the set shipping method instructions to the internal virtual cart, send instructions to set a shipping method to the external asynchronous virtual cart.

7. The system of claim 1, wherein the memory device further stores a set of instructions that when executed by the one or more processors, causes the one or more processors to:

upon receiving price cart contents instructions from another third-party application, send the price cart contents instructions to the internal virtual cart; and in response to sending the price cart contents instructions to the internal virtual cart, send instructions to price cart contents to the external asynchronous virtual cart.

8. The system of claim 1, wherein a payment captured from the payment gateway includes a merchant's portion of the captured payment, and wherein the merchant's portion of the captured payment is sent directly to the merchant without being escrowed by the multi-platform e-commerce system or any other third-party account.

9. The system of claim 8, wherein the system further includes a return management system that tracks product returns, wherein a product return automatically triggers reversal of the payment including return of the merchant's portion of the captured payment, which portion is sent directly from the merchant to the payment gateway without being escrowed by the multi-platform e-commerce system or any other third-party account.

10. The system of claim 1, wherein every action taken in the internal virtual cart associated with the multi-platform e-commerce system, results in an immediate corresponding action being performed on the external asynchronous virtual cart associated with the one or more single e-commerce platforms.

11. The system of claim 1, wherein an order is received from a purchaser via a third-party application, the order is translated into a unified order schema used by the one or more single e-commerce platforms, and then the order in the unified order schema is re-translated into an individual e-commerce format expected by the one or more single e-commerce platforms to fulfill the order.

12. The system of claim 11, wherein a product inventory status is updated after the received order has been fulfilled.

13. The system of claim 11, wherein if a product becomes out of stock on the one or more single e-commerce platforms, then an equivalent product offer in a product repository is correspondingly marked as out of stock on all third-party applications linked to the product repository where the product was previously purchasable.

14. A multi-platform e-commerce system with an asynchronous virtual cart, the system comprising:
one or more processors; and
a memory device storing a set of instructions that when executed by the one or more processors, causes the one or more processors to:
create an internal virtual cart associated with the multi-platform e-commerce system;
in response to the creation of the internal virtual cart, create an external asynchronous virtual cart associated with one or more single e-commerce platforms;
in response to every action taken in the internal virtual cart associated with the multi-platform e-commerce system, enable performance of an immediate corresponding action on the external asynchronous virtual cart associated with the one or more single e-commerce platforms;
inspect the external asynchronous virtual carts and provide a list of available shipping methods and rates during the checkout process;
dynamically collect real-time tax and shipping data directly from the one or more single e-commerce platforms which enable generation and submission of accurate price data;
upon receiving an order completion instruction from one or more third-party applications, send payment authorization to a payment gateway;
upon receiving payment authorization results from the payment gateway, submit a product order to the one or more single e-commerce platforms;
send payment capture instructions to the payment gateway;
receive payment capture results from the payment gateway; and
after payment is captured, send order to distribute the product,
wherein the system enables merchants to set default rates of revenue being offered to third-party application developers that helped generate the transaction between the third-party application developers, and enables merchants to set custom rates of revenue being offered to third-party application developers that helped generate the transaction between the third-party application developers for specific products.

15. The system of claim 14, wherein the system creates a single point of entry for merchant companies for distribution to the one or more third-party applications on the Internet.

16. The system of claim 14, wherein the system creates access to a single distribution house in the digital world for third-party application developers and end purchasers.

17. The system of claim 14, wherein the system enables merchants to individually modify rates of revenue being offered to third-party application developers that helped generate a transaction between the third-party application developers.

* * * * *

UNITED STATES PATENT AND TRADEMARK OFFICE
CERTIFICATE OF CORRECTION

PATENT NO. : 11,055,757 B2
APPLICATION NO. : 15/953068
DATED : July 6, 2021
INVENTOR(S) : Brandon Schulz et al.

Page 1 of 1

It is certified that error appears in the above-identified patent and that said Letters Patent is hereby corrected as shown below:

On the Title Page

Item (56) References Cited/Foreign Patent Documents:
"WO 2002/0765597 A2 9/2002"
Should read:
--WO 2002/075597 A2 9/2002--.

On page 2, under Item (56) References Cited/Other Publications:
"Eugeniya, "How to Create a Two-Sided Online Marketplace Platform?," Jan. 6, 2017, URL=https://hackernoon.com/how-to-create-a-two-sided-online-marketplace-platform-6d1Oeb9c03db, download date Jul. 29, 2019, 16 pages."
Should read:
--Eugeniya, "How to Create a Two-Sided Online Marketplace Platform?," Jan. 6, 2017, URL=https://hackernoon.com/how-to-create-a-two-sided-online-marketplace-platform-6d10eb9c03db, download date Jul. 29, 2019, 16 pages.--.

Signed and Sealed this
Nineteenth Day of July, 2022

Katherine Kelly Vidal
*Director of the United States Patent and Trademark Office*